(12) United States Patent
Kunio

(10) Patent No.: US 12,541,843 B2
(45) Date of Patent: Feb. 3, 2026

(54) SYSTEM AND METHOD FOR IDENTIFYING POTENTIAL FALSE POSITIVE AND BLIND SPOT LOCATIONS IN CATHETER-BASED MULTIMODAL IMAGES

(71) Applicants: CANON U.S.A., INC., Melville, NY (US); Mie Kunio, Yokohama (JP)

(72) Inventor: Mie Kunio, Yokohama (JP)

(73) Assignee: Canon U.S.A., Inc., Melville, NY (US)

( * ) Notice: Subject to any disclaimer, the term of this patent is extended or adjusted under 35 U.S.C. 154(b) by 496 days.

(21) Appl. No.: 18/016,541

(22) PCT Filed: Aug. 5, 2021

(86) PCT No.: PCT/US2021/044701
§ 371 (c)(1),
(2) Date: Jan. 17, 2023

(87) PCT Pub. No.: WO2022/031945
PCT Pub. Date: Feb. 10, 2022

(65) Prior Publication Data
US 2023/0289956 A1    Sep. 14, 2023

Related U.S. Application Data

(60) Provisional application No. 63/062,226, filed on Aug. 6, 2020.

(51) Int. Cl.
*G06K 9/00*    (2022.01)
*A61B 5/00*    (2006.01)
(Continued)

(52) U.S. Cl.
CPC .......... *G06T 7/0012* (2013.01); *A61B 5/0066* (2013.01); *G06T 7/13* (2017.01);
(Continued)

(58) Field of Classification Search
CPC ............ G06K 9/00; A61B 5/0073; G06T 7/50
(Continued)

(56) References Cited

U.S. PATENT DOCUMENTS 7,292,715 B2    11/2007   Furnish
9,557,154 B2     1/2017   Tearney et al.
(Continued)

FOREIGN PATENT DOCUMENTS

JP    H05-285102 A    11/1993
JP    2001-070229 A    3/2001
(Continued)

OTHER PUBLICATIONS

High-magnification vascular imaging to reject falsepositive sites in situ during Hexvix® fluorescence cystoscopy Blaise Lovisa Ecole Polytechnique Fédérale de Lausanne (Year: 2012).*

(Continued)

*Primary Examiner* — Seyed H Azarian
(74) *Attorney, Agent, or Firm* — Canon U.S.A., Inc., IP Division

(57) ABSTRACT

A system, method, and computer-readable media configured to process image data for detecting blind spot locations in multimodality images acquired by an imaging catheter. The method comprises: acquiring a multimodality image of a blood vessel, the multimodality image includes first image data co-registered with second image data collected simultaneously by scanning an inner wall of the blood vessel with light of two or more wavelengths transmitted through the catheter; analyzing the first image data to identify a characteristic feature of the blood vessel; detecting, based on the characteristic feature of the blood vessel, a potential blind spot location of the second image data in the multimodality image; and displaying on a display device the multimodality image with a marker showing the potential blind spot (Continued)

location of the second image data in relation to the first image data.

20 Claims, 12 Drawing Sheets

(51) Int. Cl.
| | |
|---|---|
| *A61K 35/12* | (2015.01) |
| *G06T 7/00* | (2017.01) |
| *G06T 7/13* | (2017.01) |
| *G06T 7/30* | (2017.01) |
| *G06V 10/44* | (2022.01) |

(52) U.S. Cl.
CPC ............... *G06T 7/30* (2017.01); *G06V 10/44* (2022.01); *G06T 2207/10101* (2013.01); *G06T 2207/30021* (2013.01); *G06T 2207/30101* (2013.01); *G06V 2201/07* (2022.01)

(58) Field of Classification Search
USPC ....... 382/100, 103, 106, 128–132, 154, 162, 382/168, 173, 181, 199, 209, 220, 224, 382/254, 276, 286–291, 294, 305, 312; 378/4, 21; 600/407
See application file for complete search history.

(56) References Cited

U.S. PATENT DOCUMENTS

| | | | |
|---|---|---|---|
| 10,109,058 B2 | 10/2018 | Ambwani et al. | |
| 10,842,589 B2 | 11/2020 | Kunio | |
| 12,213,810 B2* | 2/2025 | Milner | G06T 7/45 |
| 2005/0283058 A1 | 12/2005 | Choo-Smith et al. | |
| 2014/0180034 A1* | 6/2014 | Hoseit | A61B 5/0073 |
| | | | 600/407 |
| 2014/0193057 A1 | 7/2014 | Zagrodsky et al. | |
| 2014/0276107 A1 | 9/2014 | Widerberg | |
| 2016/0078309 A1* | 3/2016 | Feldman | G06T 7/50 |
| | | | 382/131 |
| 2016/0171711 A1 | 6/2016 | Gopinath et al. | |
| 2016/0228097 A1 | 8/2016 | Jaffer et al. | |
| 2017/0209049 A1 | 7/2017 | Wang et al. | |
| 2017/0301084 A1 | 10/2017 | Gopinath | |
| 2017/0309018 A1 | 10/2017 | Shalev et al. | |
| 2018/0271614 A1 | 9/2018 | Kunio | |
| 2019/0029624 A1 | 1/2019 | Kunio | |
| 2019/0099079 A1* | 4/2019 | Yamada | A61B 5/0071 |
| 2019/0192870 A1 | 6/2019 | Zaidi et al. | |
| 2019/0298174 A1 | 10/2019 | Watanabe | |
| 2019/0339850 A1 | 11/2019 | Ho | |
| 2019/0374109 A1 | 12/2019 | Wu et al. | |
| 2021/0110534 A1 | 4/2021 | Yu et al. | |
| 2021/0121132 A1 | 4/2021 | Watanabe et al. | |
| 2023/0015717 A1* | 1/2023 | Wang | A61B 5/742 |

FOREIGN PATENT DOCUMENTS

| | | |
|---|---|---|
| JP | 2011-519689 A | 7/2011 |
| JP | 2014-030488 A | 2/2014 |
| JP | 2019-088771 A | 6/2019 |
| WO | 2011/099363 A1 | 8/2011 |

OTHER PUBLICATIONS

Gounis, M.J., et al, "Intravascular Optical Coherence for Neurointerventional Surgery", Topical Review, Jan. 2019, pp. 218-223, vol. 50, Issue 1, Published by the American Heart Association (AHA), Stroke.

Wang, H., et al., "Ex vivo catheter-based imaging of coronary atherosclerosis using multimodality OCT and NIRAF excited at 633 nm," Biomedical Optics Express, Apr. 2015, pp. 1363-1375, vol. 6, No. 4.

Ughi, G.J, et al., "Dual modality intravascular optical coherence tomography (OCT) and near-infrared fluorescence (NIRF) imaging: a fully automated algorithm for the distance-calibration of NIRF signal intensity for quantitative molecular imaging," Int. J. Cardiovasc Imaging, Oct. 24, 2014, pp. 259-268, vol. 31, No. 2.

Tachtsidis, I., et al., "False positives and false negatives in functional near-infrared spectroscopy: issues, challenges, and the way forward", Neurophotonics, 2016, vol. 3, No. 3.

Nam, H.S., et al., "Spectroscopic optical coherence tomography: A review of concepts and biomedical applications," Applied Spectroscopy Reviews, 2018, pp. 91-111, vol. 53, Nos. 2-4, DOI: 10.1080/05704928.2017.1324876.

Athanasiou, L., et al., "Intracoronary near infrared autofluorescence signal calibration".

He, C., et al., "Atherosclerotic Plaque Tissue Characterization: An OCT-Based Machine Learning Algorithm With ex vivo Validation", frontiers in Bioengineering and Biotechnology, Jul. 2, 2020, vol. 8, No. 749.

Lee, J., et al., Fully automated plaque characterization in intravascular OCT images using hybrid convolutional and lumen morphology features, Scientific Reports; Nature Research, 2020, 10:2596.

Jacques, S.L., "Corrigendum: Optical Properties of biological tissues: a review", Physics in Medicine and Biology, May 2013, No. 58.

Tearney, G.J., et al., "Quantification of Macrophage Content in Atherosclerotic Plaques by Optical Coherence Tomography", Circulation, Jan. 2003, pp. 113-119.

Ughi, G.J., et al., "Automated tissue characterization of in vivo atherosclerotic plaques by intravascular optical coherence tomography images", Biomedical Express, Jul. 2013, pp. 1014-1030, vol. 4, No. 7.

Ughi, G.J., et al., "First-In-Human Dual-Modality OCT and Near-Infrared Autofluorescence Imaging of Coronary Artery Disease", JACC Cardiovasc Imaging, Nov. 2016, pp. 1304-1314, vol. 9, No. 11.

Ughi, G.J., et al., "Clinical Characterization of Coronary Atherosclerosis With Dual-Modality OCT and Near-Infrared Autofluorescence Imaging", JACC Cardiovascular Imaging, 2016, pp. 1304-1314, vol. 9, No. 11.

Van Der Meer, F.J., et al., "Localized Measurement of Optical Attenuation Coefficients of Atherosclerotic Plaque Constituents by Quantitative Optical Coherence Tomography", IEEE Transaction on Medical Imaging, Oct. 2005, pp. 1369-1376 vol. 24, No. 10.

* cited by examiner

SYSTEM AND METHOD FOR IDENTIFYING POTENTIAL FALSE POSITIVE AND BLIND SPOT LOCATIONS IN CATHETER-BASED MULTIMODAL IMAGES

CROSS-REFERENCE TO RELATED APPLICATIONS

The present application claims priority to U.S. provisional application 63/062,226 filed Aug. 6, 2020. The disclosure of the above-listed provisional application is hereby incorporated by reference in its entirety for all purposes. Priority benefit is claimed under 35 U.S.C. § 119(e).

BACKGROUND INFORMATION

Field of Disclosure

The present disclosure relates to image processing. More particularly, the present disclosure is directed to methods, systems, and computer readable media configured to implement data processing of medical images acquired from a biological lumen with a multimodality imaging catheter, and algorithmic detection of blind spot regions within such images.

Description of Related Art

Imaging catheters configured to acquire image data from biological lumens are well known. In imaging systems, such as photoacoustic intravascular ultrasound (IVUS) or optical coherence tomography (OCT), a motor coupled to the proximal end of a catheter rotates and translates an imaging probe located at the distal end of the catheter at known rates. This enables the catheter to circumferentially and axially scan the interior wall of a patient's vessel with light, to thereby generate a response signal. A photodetector collects the response signal as a function of time. The rates at which the motor rotates and translates the imaging probe with respect to the vessel wall are known a priori and/or are accurately tracked during the procedure. A processor receives the data collected by the detector, calculates the location from which the data was collected based on the rates at which the motor rotates and translates the imaging probe, and associates that location of the vessel wall with the data to generate an image of the patient's vasculature. The processor then displays the image showing the data as a function of the location and structural quality of the vessel wall. See, e.g., U.S. Pat. No. 7,292,715 which is incorporated by reference herein for all purposes.

OCT is a high-resolution imaging modality that uses backscattered light to produce two-dimensional (2D) and three-dimensional (3D) images of tissue microstructure in situ and in real-time. Intravascular OCT is widely used in Percutaneous Coronary Intervention (PCI) for investigation, diagnosis, and management of coronary artery disease. See, for example, U.S. patent Ser. No. 10/109,058, which is incorporated by reference herein for all purposes. In addition, OCT has recently been proposed as an imaging modality for the evaluation of intracranial pathology and athero-occlusive disease, for example, in diagnosis and assessment of cerebral aneurysms. See, for example, Gounis et al, "*Intravascular OCT for Neurointervention*", Published by the American Heart Association (AHA), Stroke, Volume 50, Issue 1, January 2019; Pages 218-223.

Although OCT provides an unprecedented level of morphological detail in visualizing morphologic features associated with vulnerable plaques, OCT still has limitations (OCT cannot identify necrotic core or chemicals/molecules associated with plaque progression and rupture). For example, the high scattering nature of vessel tissue and fluids contained therein (e.g., blood contained in vessels) prevent OCT from identifying important health-related parameters of imaged tissue. To complement the capability of OCT, it has been proposed to add fluorescence as a secondary modality to acquire images simultaneously and co-registered with OCT. Fluorescence is proposed because biological tissues include endogenous fluorophores that (when irradiated with light of certain wavelengths) naturally fluoresce (i.e., absorb and reemit light). For example, fluorescence detects molecules specific to necrotic cores, and the intensity of near-infrared auto-fluorescence (NIRAF) is associated with plaque types. Therefore, using OCT imaging simultaneously with a fluorescence imaging modality such as near-infrared auto-fluorescence (NIRAF) or near-infrared fluorescence (NIRF) has shown potential for improving medical imaging and diagnostic results of tissue microstructure in situ and in real-time. See, for example, Wang, et al., "*Ex vivo catheter-based imaging of coronary atherosclerosis using multimodality OCT and NIRAF excited at 633 nm*," Biomedical Optics Express 6(4), 1363-1375 (2015); Ughi, et al., "*Dual modality intravascular optical coherence tomography (OCT) and near-infrared fluorescence (NIRF) imaging: a fully automated algorithm for the distance-calibration of NIRF signal intensity for quantitative molecular imaging*," Int. J. Cardiovascular. Imagine 31, 259-268 (2014); as well as patent-related publications including US 2016/0228097, US 2017/0209049, US 2019/0099079, and U.S. Pat. No. 9,557,154.

However, since image interpretation is generally user dependent, recent studies have shown that too much data may lead to user confusion, fatigue, and possible misinterpretation of imaging data. For example, excessive data can lead to a "false positive" result which indicates that a person has a specific disease or condition when the person actually does not have such disease or condition. To avoid misinterpretation of image data, there have been proposed techniques for detection of "false positive" and "false negative" results. See, for example, pre-grant patent application publications US 2005/0283058, US 2021/0110534, and non-patent publication (NPL) Tachtsidis et al., (Tachtsidis) "*False positives and false negatives in functional near-infrared spectroscopy: issues, challenges, and the way forward*", Neurophotonics, 2016:3(3). These methods are generally automated and, in some cases, even use machine learning techniques.

Nevertheless, no method exits to notify a user of not fully classified cases (i.e., undefined or blind spot cases) where the possibility remains that certain regions may include false positive or false negative cases. In these cases, where algorithms cannot appropriately classify image regions as true false positive or true false negative, it would be advantageous to give the user an opportunity to make an actual decision based on his or her expertise. In addition, among clinical advisors and clinical teams, there is a debate on how much information should be displayed to users for safe and accurate image interpretation. Accordingly, there is a need for systems and methods that can notify a user of possible false positive, false negative, and/or potentially undefined ("blind spot") cases in a timely manner without presenting excessive information that could lead to user confusion, fatigue, and possible misinterpretation or misdiagnosis.

SUMMARY OF EXEMPLARY EMBODIMENTS

According to at least one embodiment of the present disclosure, there are provided one or more systems, methods and/or storage media for characterizing tissue and determining possible blind spot locations in an image of an object or sample, wherein the images are acquired using a catheter having multiple imaging modalities (such as, simultaneous OCT and fluorescence). The blind spot locations are image locations with undefined image data, which can include false positive and/or false negative image data. In this manner, the systems, methods, and/or storage media can notify the user of possible false positive, false negative, and/or blind spot issues, while allowing the user to quickly make an actual (real-time) accurate judgement of such false positive, false negative, and/or blind spot cases.

According to one embodiment, a method comprises concurrently acquiring OCT-NI RAF data of a sample using a multimodality catheter; analyzing OCT data out of the OCT-NIRAF data to identify characteristic features of the sample; detecting potential false positive, false negative, and/or blind spot locations of NIRAF data based on the analysis of OCT data; and displaying the OCT-NIRAF data with the detected potential false positive, false negative, and/or blind spot locations.

According to one or more embodiments, a system (100) and method (400) for detecting false positive and/or blind spot locations in multimodality images, comprises; displaying (S402) an image for each of multiple imaging modalities on a display device (300); analyzing (S408) the displayed image of at least one of the multiple imaging modalities to detect one or more characteristic features of the displayed image; detecting (S410-S412) potential false positive and/or blind spot locations for the one or more characteristic features; and updating (S414) the displayed image for each of the multiple imaging modalities with a marker showing the possible false positive and/or blind spot locations for the one or more characteristic features. According to one embodiment, the multiple imaging modalities include OCT and fluorescence modalities configured to simultaneously scan a lumen, and the characteristic features include calcific plaque of the lumen.

According to another embodiment, a method (400) of detecting false positive and/or blind spot locations in images of a multimodality probe, comprises: acquiring (S401) an image for each of a plurality of imaging modalities comprised in a multimodality probe; analyzing (S408) a first image acquired by a first imaging modality and identifying one or more characteristic features of the first image; detecting (S410-S412), based on the one or more characteristic features of the first image, potential false positive and/or blind spot locations in a second image acquired by a second imaging modality; and displaying (S414) the first image and the second image with a marker (325) showing the possible false positive and/or blind spot locations in the second image with relation to the one or more characteristic features in the first image.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

Further objects, features and advantages of the present disclosure will become apparent from the following detailed description when taken in conjunction with the accompanying figures showing illustrative embodiments of the present disclosure.

DETAILED DESCRIPTION OF EXEMPLARY EMBODIMENTS

Figure 1:
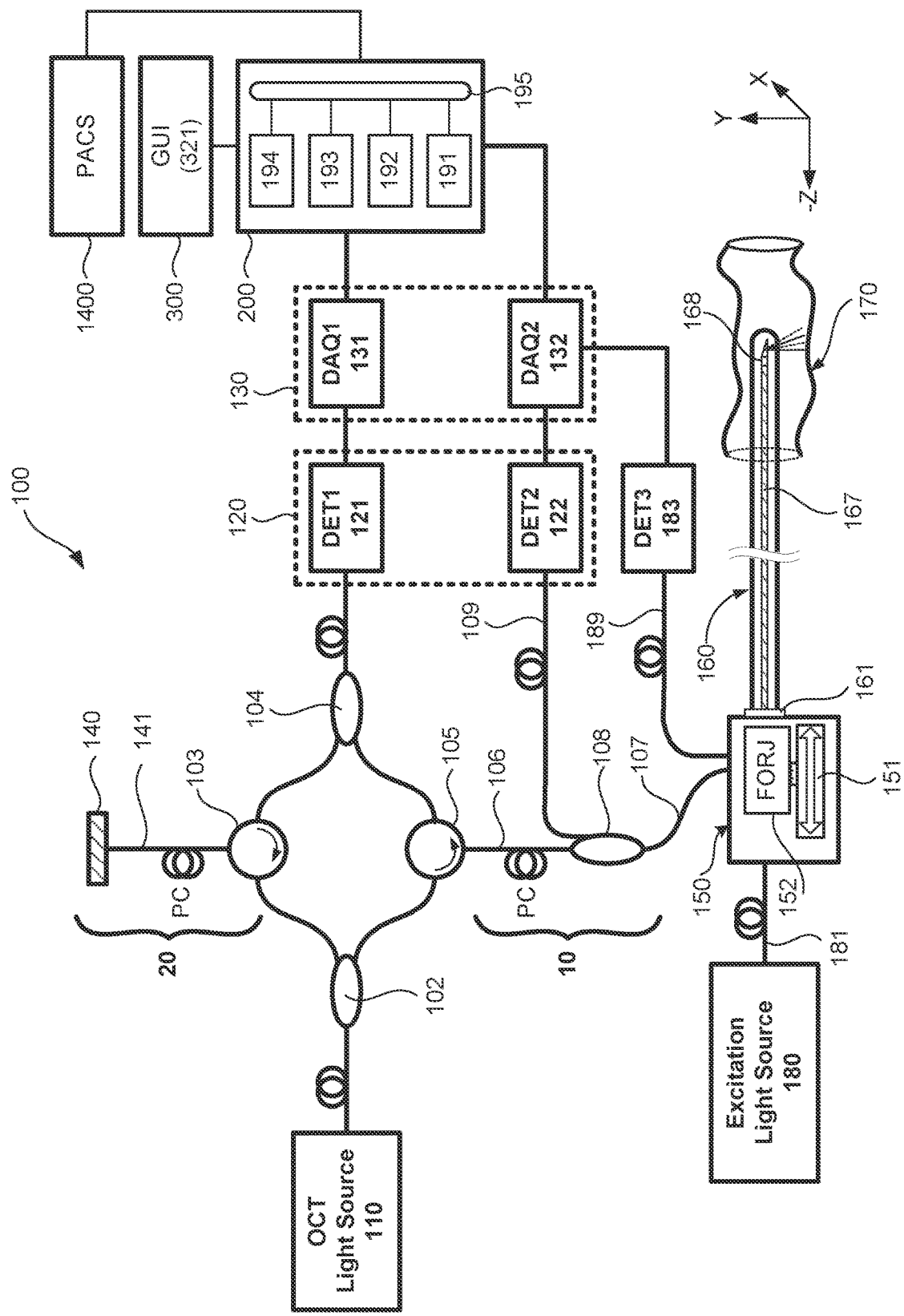
FIG. 1 illustrates an exemplary catheter-based multimodality imaging system 100 including an interferometric OCT modality and a fluorescence modality.

The present disclosure provides one or more systems, methods and storage media configured to analyze image data for characterizing tissue and determining possible false positive, false positive, and/or blind spot locations in an image of an object or sample, wherein the image is acquired using multiple imaging modalities (such as, simultaneous OCT and fluorescence) contained within a single fiber-based catheter. Several embodiments of the present disclosure, which may be carried out by the one or more embodiments of a system, method and/or computer-readable storage media of the present disclosure are described diagrammatically and visually with reference to FIGS. 1 through 11.

Before the various embodiments are described in further detail, it is to be understood that the present disclosure is not limited to any particular embodiment. It is also to be understood that the terminology used herein is for the purpose of describing exemplary embodiments only, and is not intended to be limiting.

Throughout the figures, the same reference numerals and characters, unless otherwise stated, are used to denote like features, elements, components or portions of the illustrated embodiments. In addition, while the subject disclosure is described in detail with reference to the enclosed figures, it is done so in connection with illustrative exemplary embodiments. It is intended that changes and modifications can be made to the described exemplary embodiments without departing from the true scope and spirit of the subject disclosure as defined by the appended claims. Although the drawings represent some possible configurations and approaches, the drawings are not necessarily to scale and certain features may be exaggerated, removed, or partially sectioned to better illustrate and explain certain aspects of the present disclosure. The descriptions set forth herein are not intended to be exhaustive or otherwise limit or restrict the claims to the precise forms and configurations shown in the drawings and disclosed in the following detailed description.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached", "coupled" or the like to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown in one embodiment can apply to other embodiments. It will also be appreciated by those of skill in the art that references to a structure or feature that is disposed "adjacent" to another feature may have portions that overlap or underlie the adjacent feature.

The terms first, second, third, etc. may be used herein to describe various elements, components, regions, parts and/or sections. It should be understood that these elements, components, regions, parts and/or sections are not limited by these terms of designation. These terms of designation have been used only to distinguish one element, component, region, part, or section from another region, part, or section. Thus, a first element, component, region, part, or section discussed below could be termed a second element, component, region, part, or section merely for purposes of distinction but without limitation and without departing from structural or functional meaning.

As used herein, the singular forms "a", "an", and "the" are intended to include the plural forms as well, unless the context clearly indicates otherwise. It should be further understood that the terms "includes" and/or "including", "comprises" and/or "comprising", "consists" and/or "consisting" when used in the present specification and claims, specify the presence of stated features, integers, steps, operations, elements, and/or components, but do not preclude the presence or addition of one or more other features, integers, steps, operations, elements, components, and/or groups thereof not explicitly stated. Further, in the present disclosure, the transitional phrase "consisting of" excludes any element, step, or component not specified in the claim. It is further noted that some claims or some features of a claim may be drafted to exclude any optional element; such claims may use exclusive terminology as "solely," "only" and the like in connection with the recitation of claim elements, or it may use of a "negative" limitation.

The term "about" or "approximately" as used herein means, for example, within 10%, within 5%, or less. In some embodiments, the term "about" may mean within measurement error. In this regard, where described or claimed, all numbers may be read as if prefaced by the word "about" or "approximately," even if the term does not expressly appear.

The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range, if recited herein, is intended to be inclusive of end values and includes all sub-ranges subsumed therein, unless specifically stated otherwise. As used herein, the term "substantially" is meant to allow for deviations from the descriptor that do not negatively affect the intended purpose. For example, deviations that are from limitations in measurements, differences within manufacture tolerance, or variations of less than 5% can be considered within the scope of substantially the same. The specified descriptor can be an absolute value (e.g. substantially spherical, substantially perpendicular, substantially concentric, etc.) or a relative term (e.g. substantially similar, substantially the same, etc.).

Unless specifically stated otherwise, as apparent from the following disclosure, it is understood that, throughout the disclosure, discussions using terms such as "processing," "computing," "calculating," "determining," "displaying," or the like, refer to the action and processes of a computer system, or similar electronic computing device, or data processing device that manipulates and transforms data represented as physical (electronic) quantities within the computer system's registers and memories into other data similarly represented as physical quantities within the computer system memories or registers or other such information storage, transmission or display devices. Computer or electronic operations described in the specification or recited in the appended claims may generally be performed in any order, unless context dictates otherwise. Also, although various operational flow diagrams are presented in a sequence(s), it should be understood that the various operations may be performed in other orders than those which are illustrated or claimed, or operations may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "in response to", "related to," "based on", or other like past-tense adjectives are generally not intended to exclude such variants, unless context dictates otherwise.

The present disclosure generally relates to medical devices, and it exemplifies embodiments of an optical probe such as an optical coherence tomographic (OCT) catheter combined with a fluorescence imaging probe, i.e., a multi-modality OCT (MMOCT) catheter or probe. The embodiments of the optical probe and portions thereof are described in terms of their state in a three-dimensional space. As used herein, the term "position" refers to the location of an object or a portion of an object in a three-dimensional space (e.g., three degrees of translational freedom along Cartesian X, Y, Z coordinates); the term "orientation" refers to the rotational placement of an object or a portion of an object (three degrees of rotational freedom—e.g., roll, pitch, and yaw); the term "posture" refers to the position of an object or a portion of an object in at least one degree of translational freedom and to the orientation of that object or portion of object in at least one degree of rotational freedom (up to six total degrees of freedom); the term "shape" refers to a set of posture, positions, and/or orientations measured along the elongated body of the object.

As it is known in the field of medical devices, the terms "proximal" and "distal" are used with reference to the manipulation of an end of an instrument extending from the user to a surgical or diagnostic site. In this regard, the term "proximal" refers to the portion (e.g., a handle) of the instrument closer to the user, and the term "distal" refers to the portion (tip) of the instrument further away from the user and closer to a surgical or diagnostic site. It will be further appreciated that, for convenience and clarity, spatial terms such as "vertical", "horizontal", "up", and "down" may be used herein with respect to the drawings. However, surgical instruments are used in many orientations and positions, and these terms are not intended to be limiting and/or absolute.

As used herein the term "catheter" generally refers to a flexible and thin tubular instrument made of medical grade material designed to be inserted through a narrow opening into a bodily lumen (e.g., a vessel) to perform a broad range of medical functions. The more specific term "optical catheter" refers to a medical instrument comprising an elongated bundle of one or more flexible light conducting fibers disposed inside a protective sheath made of medical grade material and having an optical imaging function. A particular example of an optical catheter is fiber optic catheter which comprises a sheath, a coil, a protector and an optical probe. In some applications a catheter may include a "guide catheter" which functions similarly to a sheath.

In the present disclosure, the terms "optical fiber", "fiber optic", or simply "fiber" refers to an elongated, flexible, light conducting conduit capable of conducting light from one end to another end due to the effect known as total internal reflection. The terms "light guiding component" or "waveguide" may also refer to, or may have the functionality of, an optical fiber. The term "fiber" may refer to one or more light conducting fibers. An optical fiber has a generally transparent, homogenous core, through which the light is guided, and the core is surrounded by a homogenous cladding. The refraction index of the core is larger than the refraction index of the cladding. Depending on design choice some fibers can have multiple claddings surrounding the core.

As used herein, a "false positive" value is an error in binary classification in which a test result incorrectly indicates the presence of a condition when such condition is not present, while a "false negative" is the opposite error where the test result incorrectly fails to indicate the presence of a condition when the condition is actually present. These are two kinds of errors in a binary test, in contrast to the two kinds of correct results (a true positive and a true negative). The term "potential" false positive, false negative, and/or blind spot refers to candidate locations identified by automated (algorithmic) analysis. According to the present disclosure, a "potential" false positive, potential false negative, and/or potential blind spot result, occurrence, or event is determined by the system, and is confirmed or rejected by a user.

<Multi-Modality OCT (MMOCT) Imaging System>

According to one embodiment, a multimodality OCT-NIRAF imaging system including a system console and a multimodality catheter are configured to acquire OCT-NIRAF images from a lumen sample such as a cardiovascular vessel. OCT images can be acquired with a swept source laser with a center wavelength of 1310 nm and a bandwidth of 127 nm. NIRAF images can be acquired by exciting the lumen sample at 633 nm and detecting fluorescence emission in a wavelength range between 660 nm and 740 nm. OCT and NIRAF illumination light were delivered to the vessel via a double-clad fiber inside the catheter. The catheter was connected to the imaging system through a patient interface unit that effectuates mechanical helical scanning. The system acquires synchronized and co-registered OCT and NIRAF data at a rate of 200 frames per second (s) with a pullback speed of 10-40 mm/s. Each OCT-NIRAF image contains 500 A-lines.

FIG. 1 illustrates an exemplary multimodality OCT (MMOCT) imaging system 100 including an interferometric OCT modality and a fluorescence modality. The system 100 may be used for endovascular imaging and could also be adapted with a balloon catheter for esophageal imaging or imaging of other similar bodily lumens. As depicted in FIG. 1, the OCT modality is comprised of an interferometer (e.g. a Michaelson interferometer) having a sample arm 10 and a reference arm 20, an OCT light source 110, a detector unit 120, a data acquisition (DAQ) unit 130, and a computer 200. The computer 200 is connected to a display device 300 and an external system such as a picture archiving and communication system (PACS) 1400. The sample arm 10 includes a patient interface unit (PIU) iso, and a fiber-based catheter 160. The fluorescence modality is comprised of an excitation light source 180, the catheter 160, a photodetector 183, the data acquisition (DAQ) unit 130, and the computer 200. In the fluorescence modality, the light source 180 is connected to the PIU 150 via an optical fiber 181.

The PIU 150 includes a non-illustrated beam combiner, a fiber optic rotary joint 152 and a pullback unit 151 (e.g., a precision linear stage). In one embodiment, the system 100 uses a swept-source laser (1310 nm+/−50 nm) as the OCT light source 110 for the OCT modality, and a Helium-Neon (He:Ne) laser with a center wavelength of about 633 nm as the excitation light source 180 for the fluorescence modality. The catheter 160 includes an imaging core comprised of a double clad fiber (DCF) 167 with a distal optics assembly 168. The distal optics assembly may include a polished ball lens at the tip of the DCF 167 for side-view imaging. The distal optics 168 may alternatively include a graded index (GRIN) lens and a refractive element (grating) attached at the tip of the DCF 167. At the proximal end, the catheter 160 is connected to the PIU 150 via a catheter connector 161.

The imaging system 100 is configured to simultaneously acquire OCT and fluorescence images from a sample 170 which may include a biological lumen, such as a vessel. To that end, light or other electromagnetic radiation (radiation of first wavelength) from the OCT light source 110 is guided through the sample arm 10 to the sample 170, and through the reference arm 20 to a reflector 140, the light travels back along the respective optical paths to thereby generate OCT interference patterns. Specifically, light from the light source 110 is split (e.g., 50/50) by a splitter 102 (fiber splitter or beam splitter) into a sample beam and a reference beam which are respectively conveyed to the sample arm 10 and the reference arm 20 via respective optical fibers. In the sample arm 10, the sample beam enters a circulator 105, passes to a fiber coupler 108 via a single-mode (SM) fiber 106, and the sample beam is delivered to the PIU 150 via a double clad fiber 107. The catheter 160 is connected to the PIU 150, and the PIU 150 is in turn connected to computer 200 (via non-illustrated electronic connections). Under control of the computer 200, the PIU 150 controls rotation of the imaging core of catheter 160 to irradiate the sample 170 with the sample beam in a scanning manner. Light of the sample beam reflected and/or scattered by the sample 170 is collected by the distal optics 168 (optical probe) arranged at the distal end of the catheter 160, and the collected light is transmitted back through the double clad fiber 167 to the PIU 150. From the PIU the collected light (sample beam) advances to fiber coupler 108 through the fiber 107. The fiber coupler 108 forwards part of the returned light towards the circulator 105 via the SM fiber 106; and the circulator 105 guides that part of the returned light to the combiner 104. In addition, the fiber coupler 108 couples another part of the returned light to the second detector 122 via a multi-mode fiber 109.

In the reference arm 20, light of the reference beam enters a circulator 103 and is delivered to the reflector 140 via an optical fiber 141. In a case of Time Domain OCT (TD-OCT) imaging, the reflector 140 may be implemented by a scanning mirror and an optical delay line (ODL). In a case of Frequency Domain OCT (FD-OCT) imaging, the reflector 140 may be implemented as a stationary mirror. Light of the reference beam reflected from the reflector 140 passes through the circulator 103, and is also guided to the combiner 104. In this manner, the sample and reference beams are combined at the beam combiner 104 and then detected by detector 121 to generate interference signals according to known OCT principles.

The detector 121 (a first detector) is implemented as an array of photodiodes, a photo multiplier tube (PMT), a multi-array of cameras or other similar interference pattern detecting device. In at least one embodiment, the detector 121 can be a balanced photodetector. The signals output from the first detector 121 are pre-processed (digitized) by data acquisition electronics (DAQ1) 131, and transferred to the computer 200. The computer 200 performs signal processing to generate OCT images in a known manner. The interference patterns are generated only when the optical path length of the sample arm 20 matches the optical path length of the reference arm 20 within the coherence length of the OCT light source 110. Polarization sensitive OCT measurements can be taken by using polarization maintaining (PM) optical fibers or through in-line paddle-based polarization controllers (PC).

In the fluorescence modality, the excitation light source 180 emits an excitation light with a center wavelength of 633 nm (radiation of second wavelength). In other embodiments, the excitation light can have different center wavelength (e.g., 485 nm) depending on the desired application. The excitation light is guided by a fiber 181, the FORJ 152, the double clad fiber 167, and the distal optics 168 to irradiate the sample 170. In response to being irradiated by the excitation light, the sample 170 emits a near infrared auto-fluorescence (NIRAF) signal or a near infrared fluorescence (NIRF) signal with a broadband wavelength in a range higher than the excitation wavelength (radiation of third wavelength, e.g., 633 to 800 nm) according known fluorescence emission principles. As used herein, fluorescence is an optical phenomenon in which the molecular absorption of energy in the form of photons triggers an immediate emission of fluorescent photons with a wavelength longer than that of the excitation light.

In one embodiment, the fluorescence light generated by the sample 170 may include auto-fluorescence, which is the endogenous fluorescence light generated without application of a dye or agent. In other embodiments, the fluorescence light generated by the sample 170 may include fluorescence light generated by exogenous fluorescence of a dye or a contrast agent added to the sample (e.g., during lumen clearance). The auto-fluorescence (or fluorescence) light is collected by the distal optics 168 of the catheter 160 and delivered back to the PIU 150, where the FORJ 152 and a non-illustrated beam combiner/splitter conveys the fluorescence signal to a detector 183 via an optical fiber 189. The signal (fluorescence intensity signal) output from detector 183 is digitized by data acquisition (DAQ2) 132 and transmitted to computer 200 for image processing. Preferably, the OCT interference patterns of the OCT modality, and the fluorescence signal of fluorescence modality are delivered to the computer 100 simultaneously.

The second detector 122 detects part of the sample beam transmitted from the fiber coupler 108 via the multi-mode fiber 109. The second detector 122 outputs an analog signal corresponding to an intensity of the backscattered light (backscattered signal). The backscattered signal returned from sample 170 and detected by the second detector 122 is not an interference signal. The signal output from detector 122 is converted to digital data with data acquisition electronics (DAQ2) 132. Notably, as later explained more in detail, the digital signal corresponding to the intensity of the backscattered light can used to calculate a distance and/or an angle at which the light from the catheter is incident on the sample 170. The intensity of the backscattered light may also be used as a trigger signal for starting and/or ending pullback and image recording operations. Therefore, the signal output from detector 122, and converted to digital data by data acquisition electronics (DAQ2) 132 can be used directly as a trigger signal or it can be transferred to the computer 200 for control processing.

As shown in FIG. 1, the computer 200 includes a central processing unit (CPU) 191, a storage memory (ROM/RAM) 192, a user input/output (I/O) interface 193, and a system interface 194. The various functional components of the computer 200 are operatively connected and communicate with each other via physical and logical data lines (a DATA BUS) 195. Storage memory 192 includes one or more computer-readable and/or writable media, and may include, for example, a magnetic disc (e.g., a hard disk drive HHD or solid stated drive SSD), an optical disc (e.g., a DVD®, a Blu-ray®, or the line), a magneto-optical disk, semiconductor memory (e.g., a non-volatile memory card, Flash® memory, a solid state drive, SRAM, DRAM), an EPROM, an EEPROM, etc. Storage memory 192 may store computer-readable data and/or computer-executable instructions including Operating System (OS) programs, and control and processing programs.

The user interface 193 provides a communication interface (electronic connections) to input/output (I/O) devices, which may include a keyboard, a display device 300 (e.g., LCD or OLED display screen), a mouse, a printing device, a touch screen, a light pen, an external optical storage device, a scanner, a microphone, a camera, a drive, communication cable and a network (either wired or wireless). The system interface 194 also provides an electronic interface (electronic connection circuits) for one or more of the light source 110 of OCT modality, excitation light source 180 of fluorescence modality, the one or more detector(s) 121 of the OCT modality, the detector 183 of the fluorescence modality, and the data acquisition (DAQ2) circuit 132, as well as the, and the patient unit interface (PIU) 150. The system interface 194 may include programmable logic for use with a programmable logic device (PDL), such as a Field Programmable Gate Array (FPGA) or other PLD, discrete components, integrated circuitry (e.g., an Application Specific Integrated Circuit (ASIC)), or any other components including any combination thereof. The function of the user interface 193 and of the system interface 194 may be realized at least in part by computer executable instructions (e.g., one or more programs) recorded in storage memory 192 and executed by CPU 191, or programs executed in a remote location via a network (e.g. cloud computing). Moreover, the computer 200 may comprise one or more additional devices, for example, components such as a communications or network interface for communicating with other medical devices, such as displays, printers, PACS 1400, etc. The functional operation of the imaging system 100 illustrated in FIG. 1 is implemented by the CPU 191 of computer 200 executing executable instructions or programs stored in the ROM/RAM of storage memory 192.

Figure 2A:
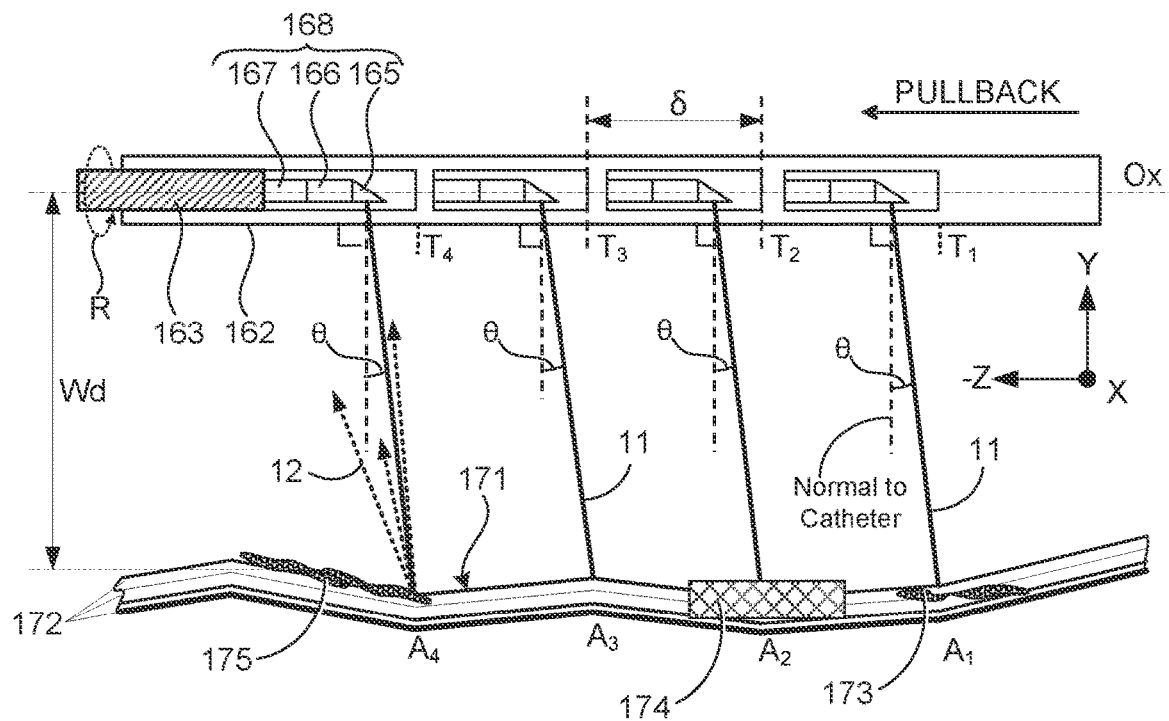
FIG. 2A and FIG. 2B respectively illustrate longitudinal and axial views of a pullback operation of the catheter-based multimodality imaging system 100.
Figure 2B:
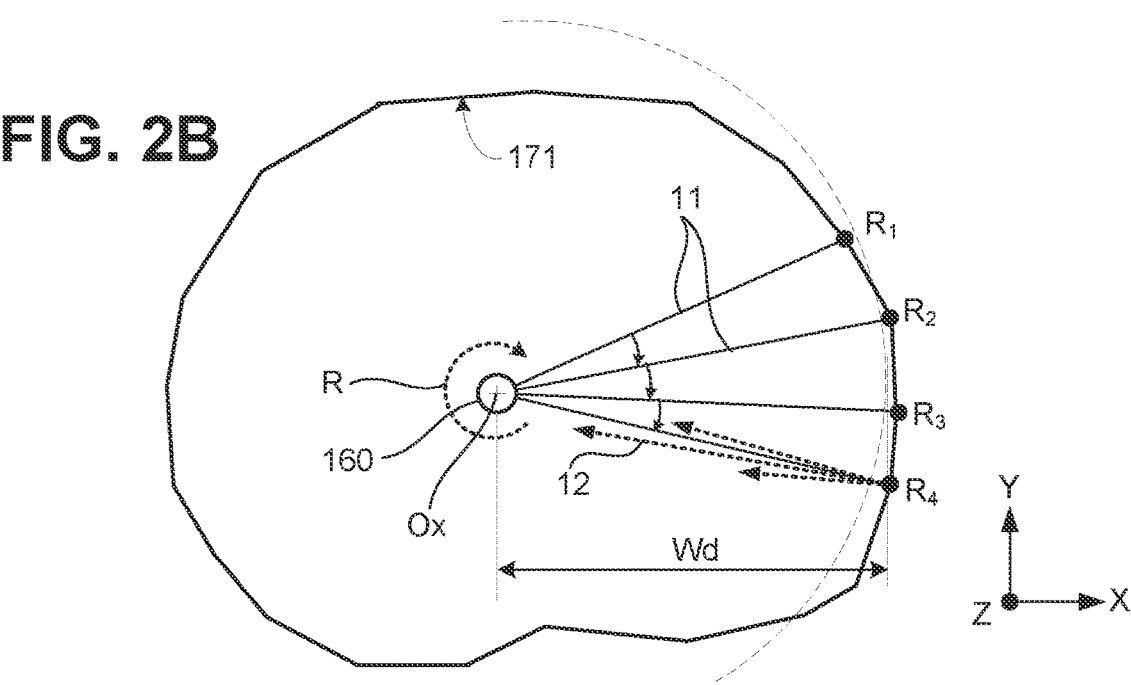

FIG. 2A and FIG. 2B respectively illustrate exemplary longitudinal and axial views of distal optics 168 (optical probe) of the catheter 160 at sequential positions during a pullback operation. As shown in FIG. 2A, the distal optics 168 (or optical probe) includes the double clad fiber (DCF) 167, a lens 166 such as a GRIN lens or a ball lens (focusing component), and a reflecting or diffracting surface 165 (beam directing component). The catheter 160 is connected at the proximal end thereof to the PIU 150 via the connector 161 (as shown in FIG. 1). A torque coil 163 delivers rotational torque from a non-illustrated rotational motor located in the PIU 150 to the distal end of the catheter 160. At the distal end of the catheter 160, the reflecting surface or diffracting surface 165 (e.g., a mirror, a prism, or a grating) deflects the illumination light (illumination light beam 11) radially toward the sample 170 (wall of a lumen cavity) which is located at a working distance (Wd). As shown in FIG. 2A, the imaging probe 168 is configured for side-view imaging, where the illumination light beam 11 is emitted from the catheter at an angle theta with respect to the catheter axis Ox, and then is incident on the sample surface 171 along a line transverse to the catheter's axis Ox. Here, since OCT data and fluorescence data are obtained simultaneously by the common probe 168, illumination light beam 11 refers to light incident on the sample 170 (regardless of whether the beam 11 is light emitted by OCT light source no and/or light emitted from excitation light source 180).

While the illumination beam 11 (including OCT light and excitation light) illuminates a bodily lumen (e.g., a vessel wall), the catheter 160 rotates or oscillates (as indicated by arrow R) about the catheter axis Ox, while the optical probe is pulled back inside a protective sheath 162 which remains stationary. In this manner, the catheter 160 can continuously scan the sample 170 with the illumination beam 11 in a rotary fashion (as shown in FIG. 2B) through successive radial positions. The distal optics or probe 168 collects a returning light 12 (sample beam) which includes backscattered light and fluorescence light from sample 170. The returning light 12 carries information about an inner surface 171 (e.g., a vessel wall). An interference signal (an interference pattern) is obtained by combining a reference light beam (not shown) and the backscattered OCT light collected from the sample 170. At the same time, a fluorescence signal is collected, detected, and stored. As explained above with reference to FIG. 1, the interference OCT signal and fluorescence signal are converted into an electronic signal, which is digitized, stored, and/or processed to analyze the status of the sample being examined. The combination of backscattered light from the sample beam 12 and reference light from the reference beam (not shown) results in the interference signal, only if light from both the sample and reference beams have traveled substantially the same optical distance (where "substantially the same optical distance" indicates a difference of less than or equal to the coherence length of the light source).

Regions of the sample 170 that reflect more light will create stronger interference signals than regions that reflect less light. Any light that is outside the coherence length will not contribute to the interference signal. The intensity profile of the backscattered light, which is also referred to as an A-scan or an A-line, contains information about the spatial dimensions and location of characteristic features. Information may include, for example, depth tissue layers 172, location of calcified plaque 173 formed on the wall or within the layers of the lumen (sample surface) 171, and location and size of a stent 174. An OCT image (i.e., a cross-sectional tomogram generally referred to as a B-scan) may be formed by combining multiple A-scans acquired at different positions along the length of the lumen wall.

The diagram of FIG. 2A depicts catheter positions (a plurality of longitudinal locations T1, T2, T3, T4) at corresponding timings t1, t2, t3, t4, etc., along the pullback path, where a different A-scan (A1, A2, A3, A4 . . . ) is collected while scanning the sample 170 with the illumination light beam 11 at a fixed angle θ. Delta (δ) is the distance the catheter travels during pullback in between successive one revolution measurements (or A-scans). In the exemplary pullback of FIG. 2A, a first A-line scan (A1) at pullback location T1 can obtain information about the tissue layers and artifact formation (neointima formation), a second A-line scan (A2) at location T2 can obtain information about stent 174 (e.g., stent thrombus, stent apposition, stent malapposition, stent edge dissection, stent-strut coverage or detection), a third A-line scan (A3) at location T3 can contain information from only tissue layers of sample 170, and a fourth A-line scan (A4) at location T4 can contain information about plaque 175 (e.g. plaque type, plaque depth) built up on the surface of sample 170. The information obtained from the A-line scans can be correlated with information acquired from the fluorescence signal to improve diagnostic results.

FIG. 2B illustrates an axial view (X-Y plane view) of the distal end of catheter 160 with exemplary illumination light beam 11 incident on the sample 170 (e.g., blood vessel wall) at a plurality of rotational locations R1, R2, R3, R4 along a helical path. Measurements at each rotational location R1-R4 are performed while scanning the sample 170 with light beam 11 at the fixed (same) angle θ. Each of locations R1, R2, R3, and R4 represents a different rotational location on the lumen inner surface at which a measurement is made while the catheter 160 rotates. Therefore, it should be appreciated that a resulting signal detected at each rotational location can have different characteristics depending on, for example, the distance (Wd) between the catheter 160 and the inner surface 171 (lumen edge) of the sample 170. In this regard, it is known that tortuosity of the lumen sample 170 can cause the catheter to bend and obtain an image while touching the lumen edge. In this case, the acquired signal can be a source of image artifacts that can cause misinterpretation of image data. For example, if the catheter 160 bends such the catheter axis is no longer at the center of the lumen, and an image is acquired when the catheter is in contact with a stent 174 or a plaque 175 (shown in FIG. 2A), the collected signal can include an erroneous fluorescence intensity signal (e.g., a false positive signal). Therefore, it is important to provide an option to the user to confirm in real time the true characteristic of such signal.

The pullback movement in the −z direction combined with rotational movement R of the catheter 160 enables A-lines to be generated multiple times by helically scanning the inner surface 171 of the sample 170. Combining a plurality of A-line scans is possible to produce a 2D image (a cross section) of the sample 170. Each 2D image of a vessel cross section, for example, may be formed by combining approximately 500 lines or more, corresponding to a full circumferential (360 degree) scan by the catheter 160. This full circumferential scan may be sometimes referred to as a "frame". Three-dimensional (3D) imaging of the inner surface 171 can be achieved by combining plural 2D image frames obtained during the longitudinal translational motion of the pullback operation while the catheter is rotating. The resulting catheter scan is a helical path of successive A-lines to form a full 3D dataset (3D volume) of the inner surface 171 of the sample 170. Data collected from successive A-line scans is processed (e.g., by fast Fourier transformation and other known algorithms) to generate OCT images of the sample 170 in a known manner. At the same time, the fluorescence signal is also collected, processed, stored/displayed, and analyzed in correspondence with the OCT images.

<Determining Potential False Positive, False Negative, and/or Blind Spot Locations>

The results of pullback and image recording operations are usually displayed "as detected". That is, the fluorescence information along with the OCT data are displayed as detected with all available information about the lumen sample and/or catheter parameters. The display of fluorescence information (NIRAF or NIRF) includes showing the fluorescence data in spatial relationship with the OCT data, and displaying certain catheter parameters under which the data was acquired. In this regard, it is common practice to display a ring of fluorescence data around a tomographic view of OCT data centered around the catheter axis. It is also known to display the OCT data and fluorescence data side-by-side to each other in a longitudinal view to represent the longitudinal view of the vessel as the catheter imaging core performs a pullback operation. In other systems, OCT data and fluorescence data can be displayed overlaid over each other either in tomographic view or in longitudinal view either in 2D or 3D representation. The present disclosure is not limited to any particular display format as long as image data of both fluorescence imaging data and OCT imaging data are displayed in a spatially co-registered manner, and potential false positive, false negative, and/or blind spot locations can be identified by a user. Examples of various manners of displaying multimodality OCT-fluorescence data are described in some of the applicant's previously published patents and patent application publications including US 2019/0339850, US 2019/0029624, and US 2018/0271614 (now U.S. Pat. No. 10,842,589), and in US Pat. U.S. Ser. No. 10/109,058 B2. These publications are all incorporated by reference herein for all purposes.

Advantageously, when catheter-based NIRAF is correlated with intraplaque characteristics or other feature characteristics determined from OCT data, it is possible to not only identify morphologically high-risk plaques, but also assess pathobiologically high-risk plaques with enough accuracy that can improve clinical results and provide better diagnostic outcomes for patient care.

However, detection of fluorescence data acquired through the catheter may be affected by the power of excitation light, the position of the catheter with respect to the lumen sample, the tissue structure of the sample, etc. For example, in some embodiments the catheter may output excitation light with a low output power which is measured as optical power per unit area (e.g. W/ma$^2$ or W/cm$^2$). In some medical applications an excitation laser may emit excitation light with an optical power below a one milli-watt level (i.e., optical power<1 mW of intensity). In such cases, the detection sensitivity of the system may not be optimal. However, this low power of excitation light is not necessarily a negative limitation because it can be designed to satisfy a safety concern which may be desirable for the safety of the patient.

To optimize detection sensitivity, according to the various embodiments of the present disclosure, appropriate detection and calibration of the catheter to lumen distance, and accurate detection of the fluorescence signal are based on analysis of OCT data, catheter parameters, and other factors related to the procedure and the subject sample. This enables the system to identify potential false positive, false negative, and/or blind spot regions from non-NIRAF information. To identify a "false positive" case, the system can utilize lumen detection results and evaluate the distance from the lumen to the catheter sheath. To identify a "blind spot" case, the system can utilize plaque type characterization, which can be performed by image processing of intravascular OCT and/or spectroscopic OCT (S-OCT). S-OCT is a signal-processing technique that uses the raw interferogram generated by OCT interferometry to investigate depth-resolved spectroscopic profiles of a sample. The spectroscopic information provided by S-OCT can be used to enhance the contrast of OCT images and overcome limitations of gray-scale OCT images that describe only morphology. See, Hyeong Soo Nam & Hongki Yoo "*Spectroscopic optical coherence tomography: A review of concepts and biomedical applications*," Applied Spectroscopy Reviews, 53:2-4, 91-111, 2018, DOI: 10.1080/05704928.2017.1324876.

When processing multimodality data of a sample using a fluorescence signal, signal attenuation (attenuation coefficient) due to calcified tissue has the greatest impact on NIRAF detection. Other information of characteristic features can include, but are not limited to, lumen diameter, external elastic lamina (EEL), lumen or catheter geometric characteristics (e.g., ovalization, collapse, etc.), lumen flushing efficiency, etc., as further explained below with reference to the image processing algorithms of FIG. 4, FIG. 5 and FIG. 6.

An example of appropriate detection and calibration of the catheter to lumen distance is disclosed in applicant's previously disclosed patent application publication US 2019/0298174. An example of image processing for plaque type characterization includes, but is not limited to patent application publication US 2017/0209049. These publications are both incorporated by reference herein in their entirety. Briefly, for distance calibration, the acquired OCT-NIRAF data was post-processed. This post-processing was performed after histology processing (described below). First, a background signal was subtracted from the detected NIRAF signal. The background signal was evaluated by averaging NIRAF signal level from lumen samples imaged under phosphate-buffered saline (PBS) solution. Then, the background subtracted signal was calibrated to remove the influence of the distance between lumen edge and catheter. The distance between lumen edge and the catheter was evaluated from OCT images without using fluorescence data.

The system can be configured to display a warning of potential false positive, false negative, and/or blind spot cases (locations) within an acquired multi-modality image. The warning or warnings can be programmed to be toggled ON/OFF based on a user's preference. When considering the catheter power, the system can be configured to automatically mark around regions of potential false positive, false negative and/or blind spot cases based on the fluorescence being compared to a minimum detection threshold. For example, a system limit of detection (LOD) value can be used as the threshold. Then, during image processing, if the fluorescence signal does not satisfy the threshold, the system marks the area of the multimodality image as a potential false positive, false negative and/or blind spot. In addition, if the system finds an area that does not satisfy a set threshold intensity, the system can also take into consideration the catheter to lumen distance in this area to generate a warning. For example, if the system detects an area of weak signal and the lumen to catheter distance in that area is greater than a threshold A and the signal is less threshold B, then this is a warning area. To simplify the user evaluation and decision making process, the system can be configured to utilize different display patterns or color or markings to show potential false positive, false negative, and/or blind spot areas, as discussed below with respect to FIG. 9, FIG. 10A-10D, and FIG. 11.

According to one or more embodiments, the system 100 of FIG. 1 is configured to obtain combined OCT-fluorescence data; analyze the OCT data; detect potential false positive, false negative, and/or blind spot locations of fluorescence data based on analysis of OCT data; and display the OCT-fluorescence data with the detected potential false positive, false negative, and/or blind spot locations. Obtaining OCT-fluorescence data can include simultaneously acquiring OCT-fluorescence images with a multimodality catheter and running OCT analysis in situ and in real time. In some embodiments, the system can import already pre-acquired multimodality OCT-fluorescence data for OCT analysis. An important aspect of the process includes using the OCT data (non-fluorescence data) and/or an analysis result of non-fluorescence data to identify potential false positive, false negative, and/or blind spot locations of specific features in the fluorescence data. Fluorescence data may include near-infrared auto-fluorescence (NIRAF) or near-infrared fluorescence (NIRF) data.

Figure 3:
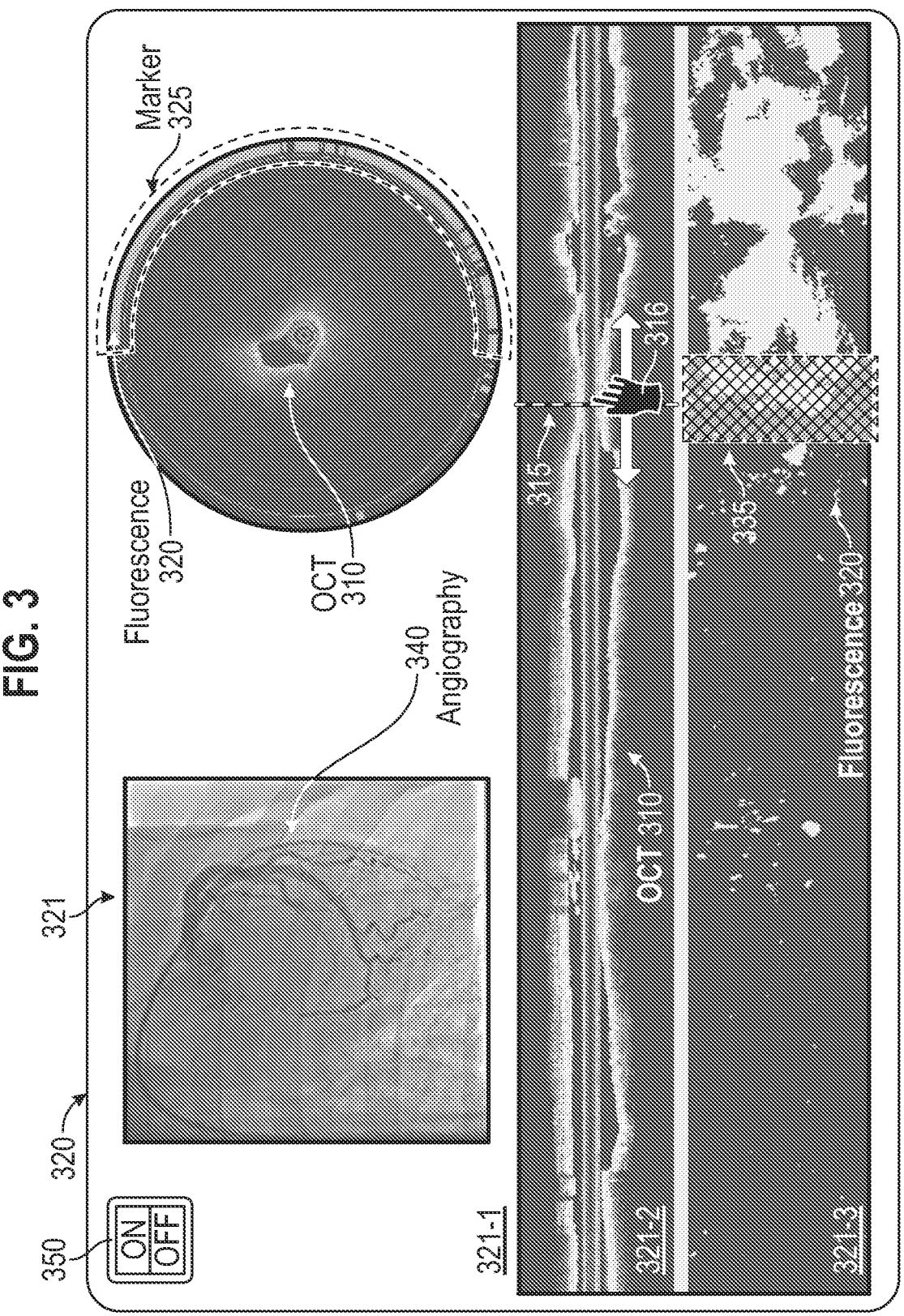
FIG. 3 illustrates a display device 300 with an exemplary graphical user interface (GUI) 321 for displaying potential false positive, false negative, and/or blind spot locations of multimodality data acquired by scanning a biological sample with a multimodality imaging catheter.

FIG. 3 illustrates an exemplary graphical user interface (GUI) 321 displayed in a screen of display device 300 for providing the user with information about potential false positive, false negative, and/or blind spot locations in multimodality image data of a lumen sample 170. The multimodality image data is acquired by the MMOCT system too of FIG. 1 according to the exemplary process shown in FIG. 2A and FIG. 2B. In FIG. 3, the GUI 321 shown in display device 300 is controlled by CPU 291 of computer 200 according to customized algorithms (FIG. 4 through FIG. 8B) to display co-registered multimodality image data, such as, for example, fluorescence image data and OCT image data in a plurality of separate display panels including a first panel 321-1, a second panel 321-2, and a third panel 321-3. The first panel 321-1 can display an angiography view 340 and a multimodality image comprised of a tomography view of OCT data 310 combined with fluorescence data 320. The second panel 321-2 can display a longitudinal view of the lumen sample showing only the OCT data 310 for assessing structural characteristics of the lumen sample. The third panel 321-3 is configured to display a longitudinal view of the fluorescence data. The longitudinal view of the OCT data 310 and the longitudinal view of the fluorescence data 320 are co-registered to show longitudinal correspondence of the fluorescence data with respect to the OCT data along the length of the lumen sample. The tomographic view displayed in the first panel 321-1 shows the co-registered circular (polar) correspondence between the fluorescence data 320 and the OCT data 310 along the circumference of the lumen sample. The location of the lumen sample from which the tomographic view is acquired is identified in the longitudinal view by a line indicator 315 shown in the second panel 321-2, and by a box frame 335 shown in the third panel 321-3. The line indicator 315 can be a movable component of GUI 321 that can be interactively controlled by the user to move bi-directionally along the length of the longitudinal view with a pointer 316, such as a mouse, a joystick, or by touching the screen of display 320. In this manner, the user can interactively choose the longitudinal location of the lumen sample where characteristic features need to be assessed. When the user moves the pointer 316, the line indicator 315 moves together with the boundary box 335 and the tomographic view changes according to the position of the line indicator 315.

In the first panel 321-1, the tomographic view of the OCT data 310 shows an axial view (a first view) of the lumen sample where the fluorescence data 320 is shown as an arc or partial ring arranged around the edge of tomographic view. However, when this fluorescence data 320 is suspected to be a potential false positive, false negative, and/or a blind spot, the system adds a marker 325. The system can determine that the fluorescence data is not a true positive signal due to a variety of reasons including, for example, the structural characteristics of the OCT data 310 cannot confirm that the fluorescence signal comes from a fluorescence source. In other words, as explained more in detail below, the system cannot confirm that the fluorescence data 320 is a positive fluorescence signal. Therefore, the system displays a marker 325 shown as a dotted line around the fluorescence data 320. This marker 325 should be displayed in a distinctive and conspicuous manner so as to prompt the user's attention about the existence of potential false positive, false negative, and/or blind spot (artifacts) data within the multimodality image.

In the second panel 321-2 and third panel 321-3, the location of fluorescence data 320 with respect to the OCT data 310 is shown in the longitudinal view (a second view) side-by-side to each other. In other words, the same fluorescence data 320 displayed in around the edge of the tomographic view is also shown as a potential false positive, false negative, and/or a blind spot location by, for example, a boundary box 335 in the longitudinal view in the third panel 321-3. Here, it must be noted that the OCT data 310 and fluorescence data 320 need not be displayed separately from each other. In at least some embodiments, the OCT data 310 and fluorescence data 320 can be displayed overlaid over each other, as long as the location of suspected false positive, false negative, and/or blind spot data is clearly identifiable by the user.

In at least some embodiments, the display of potential false positive, false negative, and/or blind spot information is configured to toggle on/off according to a user's preference, so as to not interfere with the user's ability to examine the displayed information. To that end, the GUI 321 may include one or more toggle buttons 350 (or a toggle switch), which the user can operate to execute one or more of the algorithms described herein to locate potential false positive, false negative, and/or blind spot locations. Moreover, the computer 200 can prompt a user to select whether to show the potential false positive, false negative, and/or blind spot locations either before or after displaying the imaging results of a given procedure. The system can prompt the user to confirm whether he/she prefers to check for locations of suspected data in every image frame or every number of image frames of collected data. In at least one embodiment, the system 100 can be configured to detect all possible suspect locations in a single frame or in multiple frames to determine whether a false positive, false negative, and or blind spot case exits. When at least one potential case exists, the system can display the marker 325 and/or the boundary box 335 around each detected potential false positive, false negative and/or bind spot location.

Alternatively, in at least some embodiments, the system can be configured to receive an input from the user to mark any false positive, false negative, and or blind spot location along the entire pullback length of the lumen sample, when the user suspects that the image data could include such locations. For a case where the user suspects of potential false positive, false negative, or blind spot locations after acquiring the image data, the user can move the location line indicator 315 along the length of the lumen sample displayed in the second panel, and when the user clicks or drops the line indicator 315 at a certain location, the system can add a boundary box 335 to the corresponding fluorescence data to mark the suspected location.

<Algorithmic Analysis of Multimodality OCT-Fluorescence Images>

Figure 4:
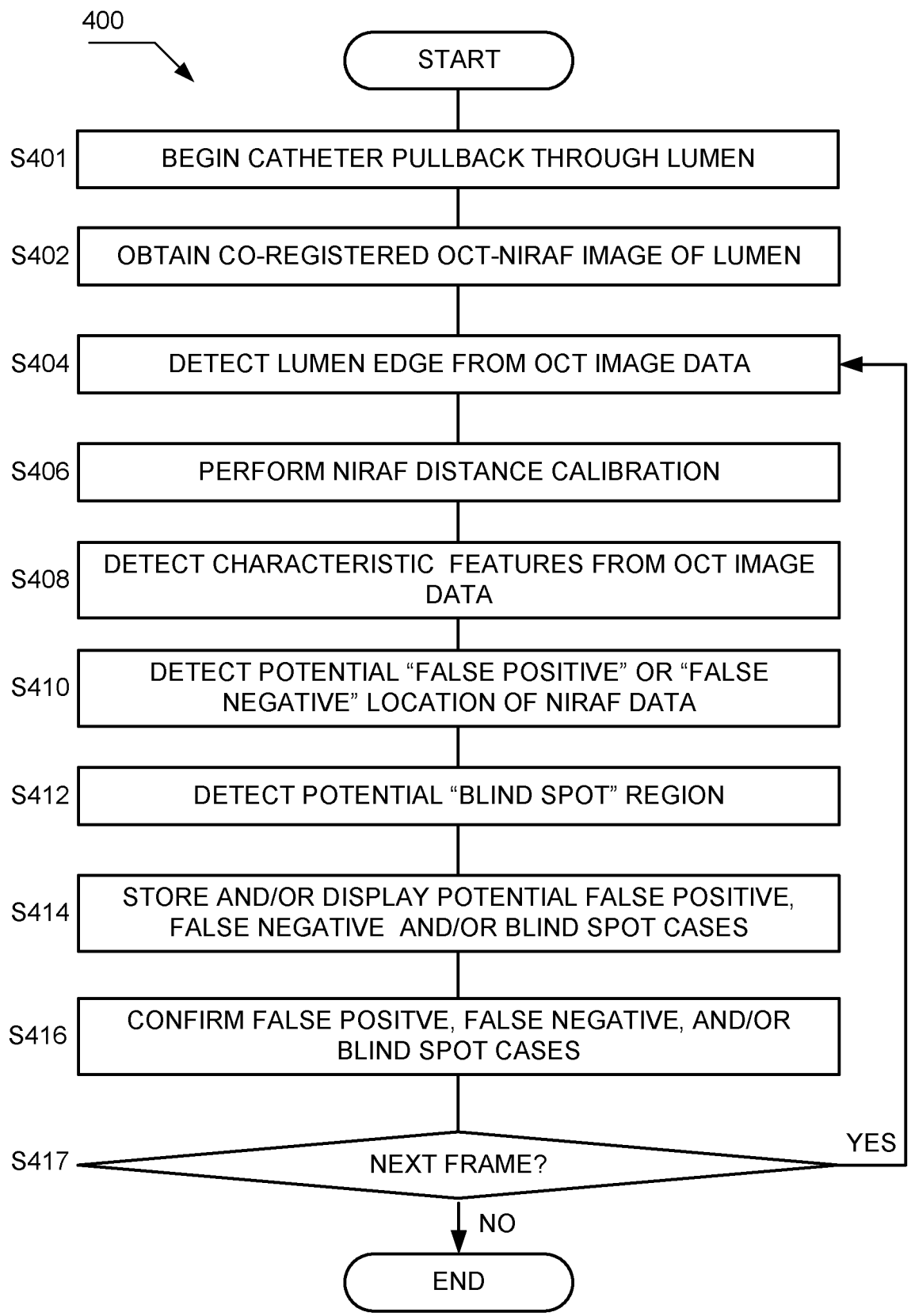
FIG. 4 shows an exemplary algorithm 400 for detection of potential false positive, false negative, and/or blind spot locations, according to one embodiment of the present disclosure.

FIG. 4 shows an exemplary algorithm (process 400) of an overall workflow for image processing of OCT-fluorescence data to detect false positive, false negative, and/or blind spot locations, according to one embodiment of the present disclosure. In one embodiment, the process 400 of the imaging system 100 is implemented by the CPU 191 of computer 200 executing executable instructions or programs stored in the ROM/RAM of storage memory 192. In other embodiments, process 400 can be performed by any suitable computing device or devices other than CPU 191, such as, e.g., remote cloud computing. As used herein the term process or "algorithm" refers to a finite sequence of steps for solving a logical or mathematical problem or performing an organized process. An algorithm may be described in any understandable terms including as a mathematical formula, in prose, or as a flow chart, or in any other manner that together with the hardware structure already described above will provide sufficient structure for implementing the various aspects of the block diagrams and flow diagrams of present disclosure. Some portions of the detailed descriptions that follow are presented in terms of algorithms and symbolic representations of operations of a processor (e.g., a CPU or an MPU) on data sets stored memory. These algorithmic descriptions and representations can be used by persons of ordinary skill in the art to implement the various embodiments disclosed herein. In the present disclosure, each flow chart is described a sequence of operations that produce a specific and unique result. The operations may include physical manipulations of hardware structures in combination of software manipulations of image data sets and/or mathematical operations. Usually, though not necessarily, the physical quantities make take the form of electrical, optical, or magnetic signals capable of being detected, stored, transferred, combined, compared, and otherwise manipulated to accomplish a concrete, tangible, and useful result. Throughout the description of the present disclosure, terms including processing, computing, calculating, determining, and the like, refer to actions and processes of a computer system, logic circuitry, a processor or processor, or other similar electronic device that manipulates and transforms information as data sets and outputs a result represented as a physical (electronic) output, such as an image, text, sound, movement, etc.

Referring back to FIG. 4, the workflow process 400 for false positive, false negative, and/or blind spot detection includes as series of steps S402 through S417. While for purposes of simplicity of explanation, process 400 is shown and described as a series of steps, it is to be appreciated that such process is not limited by the order in which these steps are presented. Some steps can occur in different order and/or concurrently with each other, which can be different from that shown and described. In some embodiments, less than all illustrated blocks or steps may be required to implement the given process. In other embodiments, process steps or blocks may be combined or separated into multiple sub-steps or components. In addition, alternative but equivalent steps or processes can employ additional not illustrated blocks which can be inferred from the overall disclosure. In the process 400, the workflow starts at step S401 where the computer 200 controls the OCT modality and the fluorescence modality of FIG. 1 to first initiate a pullback operation. As it is known to those skilled in the art, prior to pullback, the system first executes a clearance process to "flush" the blood surrounding the catheter tip. Then at step S402, the system uses a trigger signal to simultaneously acquire data of OCT and florescence images. The OCT-fluorescence image data can be acquired simultaneously (i.e., at substantially the same time) and co-registered (i.e., from the same location). However, each type of data can be collected separately by the two distinct imaging modalities shown in FIG. 1. Fluorescence image data can include NIRAF or NIRF data sets (fluorescence intensity), and OCT data can include 2D tomographic images (pixel data) made of plural A-scans, or 3D image volumes (voxel data) formed by plural 2D images (B-scans).

At step S404, the computer 200 processes the acquired image data to detect a lumen edge from the OCT image data. Lumen edge detection can be performed by analyzing each A-line of OCT data, by analyzing each frame of OCT data, and/or by slicing and analyzing 3D volumes of OCT data. Various examples of lumen edge detection are described in applicant's previously disclosed pre-grant patent application publication US 2019/0374109 which is incorporated by reference herein in its entirety.

At step S406, the computer 200 performs NIRAF distance calibration. For NIRAF distance calibration, from the OCT-fluorescence dataset acquired at step S402, a section of the OCT-fluorescence data is selected. The data section can be a selected from a single frame or from a plurality of data frames of the helically scanned data. If preferable, prior to selecting the data section, outlier data points in fluorescence data can be removed by, for example, applying a smoothing filter to the OCT-fluorescence dataset acquired at step S402. From the selected data section, a maximum fluorescence value is calculated and compared with a fluorescence detection threshold. In some embodiments, a system limit of detection (LOD) value can be used as the fluorescence detection threshold. The LOD value can be based on system parameters; or it can be experimentally determined by the user; or it can be determined with system calibration data, such as based on background signal measurements. Based on the result of the comparison of maximum fluorescence value to the LOD value, different algorithms can be applied to the selected data section to perform NIRAF distance calibration. See, for example, applicant's previously filed U.S. provisional patent application 62/925,655, now patent application Ser. No. 17/077,894, published as pre-grant publication US 2021/0121132; see also applicant's pre-grant patent application publication US 2019/0298174, which are both incorporated by reference herein for all purposes. Further examples of distance calibration are described by Ughi et al., in "*Dual modality intravascular optical coherence tomography (OCT) and near-infrared fluorescence (NIRF) imaging: a fully automated algorithm for the distance-calibration of NIRF signal intensity for quantitative molecular imaging*", the International Journal of Cardiovascular Imaging volume 31, pages 259-268 (2015).

At step S408, computer 200 analyzes the OCT data and detects characteristic features of the lumen sample and/or catheter from the OCT image. OCT characteristic features can include, but are not limited to, plaque type, external elastic lamina (EEL), geometric characteristics (e.g., existence of vessel side branch), adequacy of flushing (e.g. determining if any residual blood remains within the lumen), sheath diameter (e.g., determining if there exists any deformation in the catheter sheath diameter). The OCT data analysis can be done frame by frame for each A-line, for every 10 (or other predetermined number) of A-lines, or for the entire tomographic view. In addition, to improve the accuracy of analysis, cross-frame analysis can be performed; cross-frame analysis may involve comparing the nearby frames, e.g., 10 frames (or a predetermined number of frames) prior and after a target frame. Further improvement in the detection of characteristic features can be achieved by comparing the OCT data to corresponding histological images and/or confocal images, as described below with reference to FIGS. 7A, 8A and 8B.

At step S410, based on the characteristic features detected at step S408, computer 200 detects potential false positive cases or potential false negative cases, labels and stores information relevant to each potential case. Similarly, at step S412, computer 200 detects potential blind spot cases, labels and stores each potential blind spot case. Exemplary processed for detecting potential false positive, false negative, and/or blind spot cases are described below with reference to FIG. 7, FIG. 8A, and FIG. 8B.

In one embodiment, a blind spot is defined as a spot that the MMOCT catheter cannot detect a fluorescence signal because of biological, pathological, and/or technical reasons. For example, due to differences in optical properties of lesions in the lumen wall, specific plaque lesion types may not deliver a fluorescence signal to the catheter, as compared to other plaque types. This causes no detection of fluorescence via the imaging catheter. However, it is likely that the OCT signal can positively identify a change of tissue structure in such locations where no fluorescence signal is detected. Therefore, the system is configured to determine from the OCT image data whether the image contains at least one region with potential false positive, false negative, and/or blind spot locations based on characteristic features such as plaque types. For any region greater than a predetermined size (e.g., greater than a predetermined number of pixels or voxels) for which a determination is made as a potential false positive, false negative, and/or blind spot location, the system is configured to record the location of the lumen sample 170, and later display such locations for the user to confirm existence of fluorescence or lack thereof.

Therefore, at step S414, computer 200 stores and/or outputs the detection results to the display device 300, and displays the results in a graphical user interface (GUI), for example, in GUI 321. In particular, as illustrated in FIG. 3, the computer 200 can be programmed to display a boundary box 335 in the longitudinal view showing the lengthwise location of potential undefined data, and can also display a marker 325 shown as a dotted line partial ring around the edge of the tomographic view showing the radial location (e.g., a vessel layer) of potential undefined data.

At step S416, computer 200 controls display device 300 to prompt the user to review and confirm whether the displayed locations are true false positive or true false negative signals. In this step 416, computer 200 can be particularly configured to prompt the user to review the blind spot locations, and visually determine whether those locations are true positive, true negative, or other (e.g., image artifacts).

At step S417, computer 200 is configured to again prompt the user (or configured to automatically determine) whether to repeat the process of steps S404-S416 until all frames, or a predetermined number of frames, or the complete tomographic image is processed.

Figure 5:
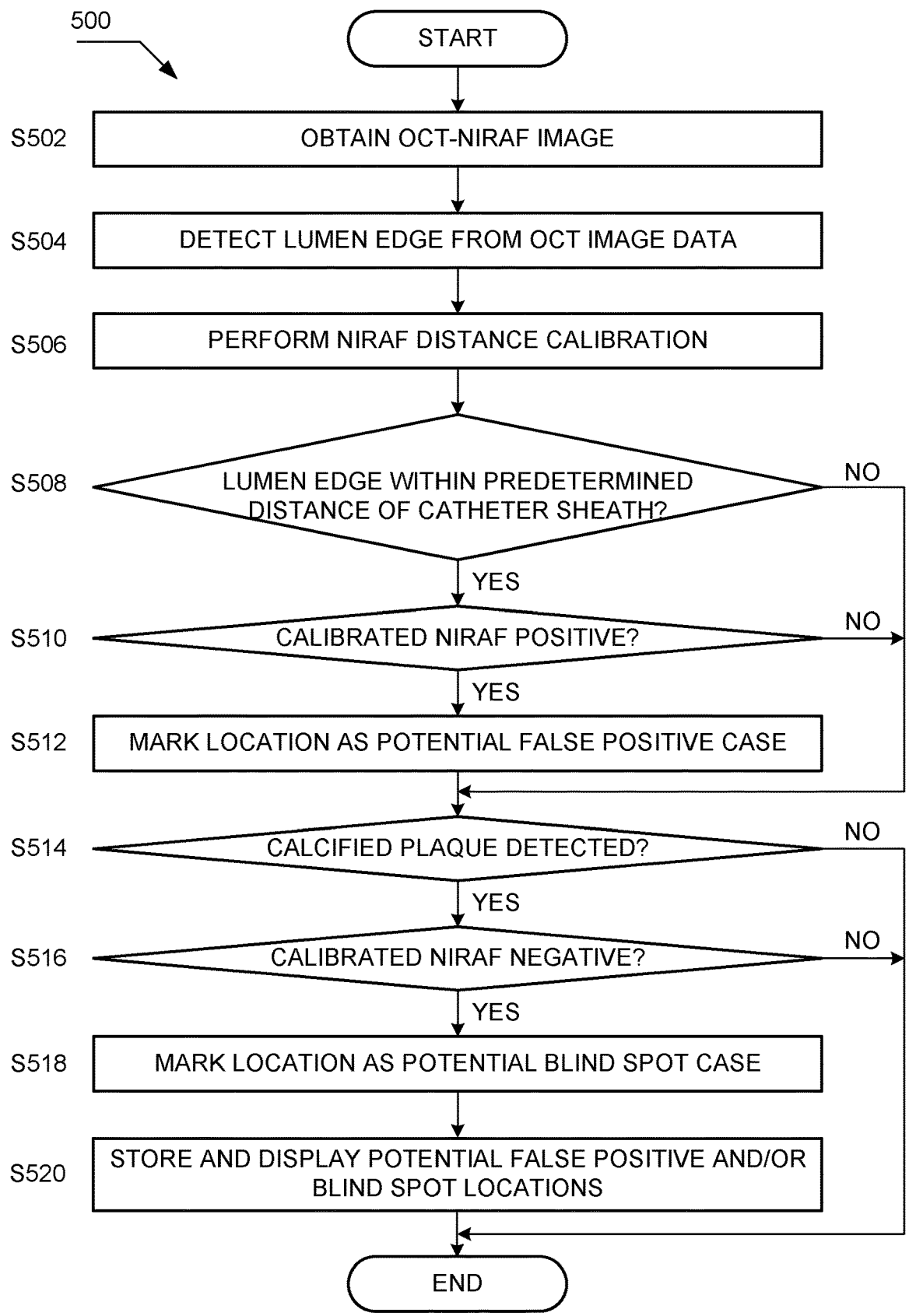
FIG. 5 illustrates a workflow process 500 for detection of potential false positive, false negative, and/or blind spot locations according to another embodiment of the present disclosure.

FIG. 5 illustrates a workflow process 500 for detection of false positive, false negative, and/or blind spot locations according to another embodiment of the present disclosure. The process 500 of the imaging system too is implemented by the CPU 191 of computer 200 executing executable instructions or programs stored in the ROM/RAM of storage memory 192. Steps S502, S504, and S506 are similar to steps S402-S406, respectively. At step S508, the computer 200 detects whether the lumen edge in the OCT image is located at or within certain distance from the catheter sheath. Here, the distance should be a small distance like, for example, to microns, which depends on the OCT resolution. If the outcome for step S508 is YES (i.e., the lumen edge is at or within a predetermined distance from the catheter sheath), the system checks the fluorescence level (fluorescence intensity value) at step S510. If fluorescence signal is positive, for example, if the fluorescence signal is above system detection limit (LOD), and/or above a pre-determined threshold value set by the user or system, then the system determines that the location is potential false positive. In other words, at step S510, the reason for having a positive detection of fluorescence is most likely because the catheter is touching the lumen edge. In this case, the system stores the location as a potential false positive case at step S512.

On the other hand, if the outcome for step S508 or step S510 is NO, then the system moves forward to the remaining steps to determine if potential blind spot cases exits (steps S514-S518). For a blind spot case detection, the system first checks whether there is any reason for not detecting a fluorescence signal. Reasons for a potential blind spot may include one or more of a biological reason, a pathological reason, and/or a technical reason. A biological reason can be that, for example, a molecular source of fluorescence is located further from the reach of excitation light, or that a low volume of molecular source of fluorescence exits. In other words, there is a biological reason for which a fluorescence signal is not detected. A pathological reason can be that, for example, calcified plaque exits in some region of the lumen sample, or the existence of thrombus, or other structure that can attenuate or block fluorescence from reaching the catheter. A technical reason can be that, for example, there is a high system detection limit, there is a high threshold to consider fluorescence signal is positive, or there is low excitation light power, or there is excessive distance from catheter to lumen edge.

Therefore, at step S514, the system checks the OCT signal to determine whether calcified plaque is detected. In alternate embodiments, the system can be configured to detect any other factor(s). If the system identifies any potential reasons for blind spot in the OCT image data (e.g., if calcified plaque was detected), then the system checks the fluorescence signal levels at step S516. If the fluorescence signal is negative (i.e., a fluorescence signal is not detected) due to, for example, the fluorescence signal is below system detection limitation and/or below the pre-determined threshold set by the user or system, then the system determines proceeds to step S518 and marks the location as a potential blind spot at step S518. The process for the analysis of steps S508 to S518 can be performed continuously in real time during the entire pullback operation, and it can be done for each A-line scan, for each predetermined number of A-lines (e.g., every 10 A-line scans), or in the entire tomographic image. At step S520, the computer 200 outputs the detection results to display device 300, and displays the results in the graphical user interface 321, as shown in FIG. 3. Here too, the user can be actively prompted by the computer 200, as in step 416, to confirm each marked location based on the user's own experience and knowledge of the illustrated data. That is, the user can confirm whether a potential blind spot case should be a true false positive or true false negative case.

Figure 6:
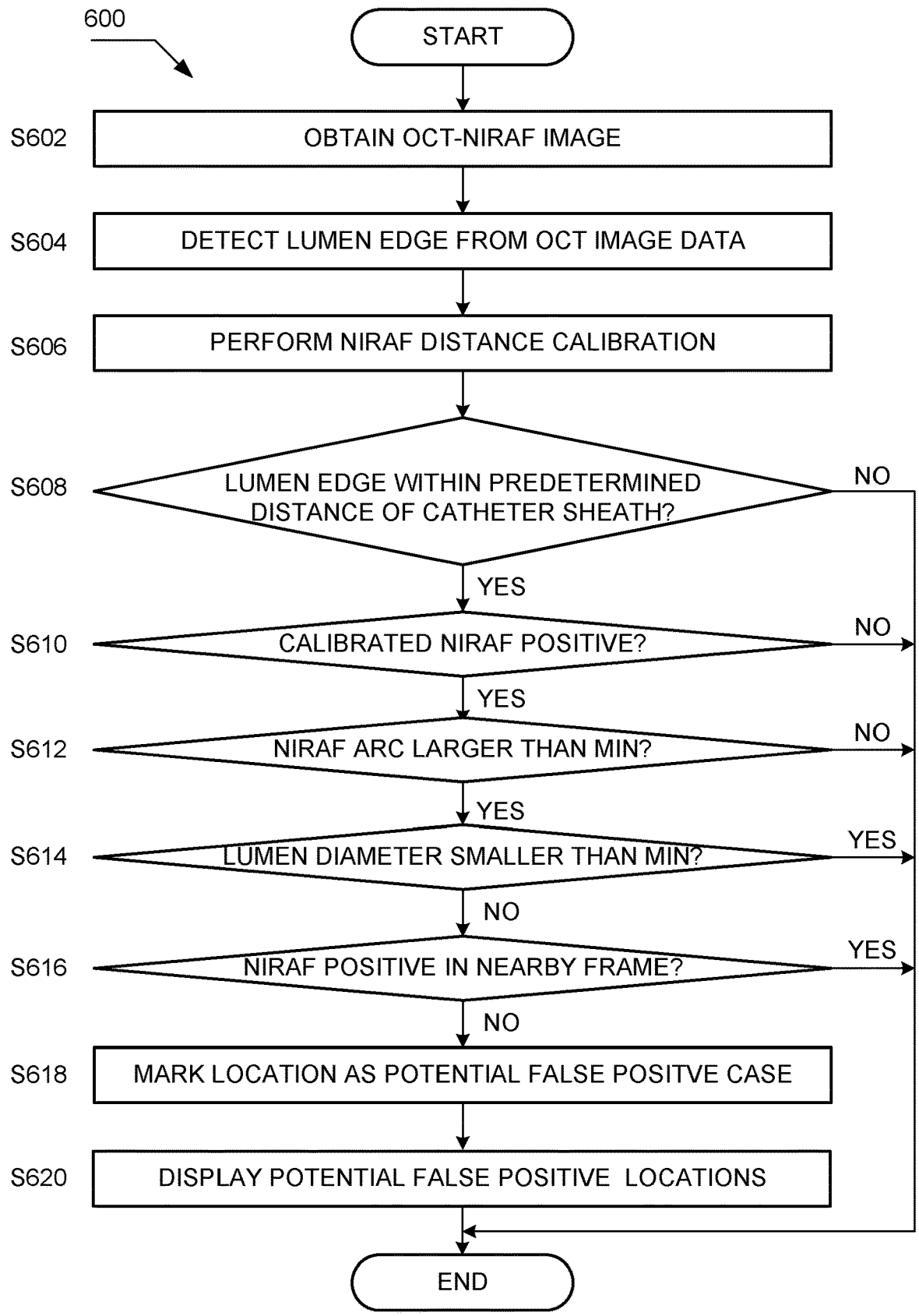
FIG. 6 illustrates a workflow process 600 for detection of potential false positive, false negative, and/or blind spot locations according to yet another embodiment of the present disclosure.

FIG. 6 illustrates a workflow process 600 for detection of false positive, false negative, and/or blind spot locations according to yet another embodiment of the present disclosure. The process 600 of the imaging system 100 is implemented by the CPU 191 of computer 200 executing executable instructions or programs stored in the ROM/RAM of storage memory 192. The workflow process 600 focuses mainly on "false positive" detection. Steps S602, S604, and S606 are similar to steps S402-S406 of FIG. 4. Step S608 is similar to step S508; that is, the computer 200 determines whether the lumen edge is at or within a predetermined distance from the catheter sheath; the predetermined distance should be small, e.g., around 10 microns and primarily depends on the OCT maximum resolution of the system. If the catheter is at or within a predetermined distance from the lumen edge (YES in S608), the process proceeds to step S610. At step S610, the computer 200 determines whether the signal of the "calibrated NIRAF" is positive. Here, the NIRAF signal is "positive" if an actual NIRAF signal is collected by the catheter and detected by the system. If a NIRAF signal is detected (YES at S610), the process advances to step S612. If the NIRAF signal is not detected (NO at S610), the process advances directly to a stop or end step. In other words, as soon as the computer 200 determines that the lumen edge is NOT at or within a predetermined distance from the catheter sheath, the process for detecting potential false positive cases is ended. Here too, the system computer 200 can take into consideration the lumen edge distance in combination with other parameters such as signal intensity threshold related to a specific area of concern.

At step S612, to avoid outlier cases, the computer 200 can also check the size of the NIRAF arc (the angle) in the tomographic view. That is, the system determines if the NIRAF signal in tomographic view is larger than a minimum (MIN) angle. If the arc of the NIRAF signal is larger than a certain number of degrees, e.g., larger than 10 degrees (YES at S612), the NIRAF signal is confirmed and needs not be processed any further, so the process advances to stop or end the process. If the NIRAF signal is positive (YES at S610) and after removing the outliers (NO at S612), then the computer 200 checks the diameter of the lumen at step S614. When the lumen diameter is small (smaller than a minimum threshold), it is highly likely that the current OCT image is acquired from a region in the lumen sample where there is a lesion. If there is a lesion in the wall of the lumen sample, fluorescence is highly likely to be observed. Therefore, if the outcome at step S614 is YES (i.e., the lumen diameter is smaller than expected), computer 200 confirms the signal is appropriate (validates the data) and ends the process.

At step S616, when the lumen diameter is not smaller than a minimum, the system computer 200 checks whether nearby frames show a NIRAF signal (cross-frame analysis). If many nearby frames show a NIRAF signal, it is highly likely that the current frame shows a true fluorescence signal. Therefore, at step S616 (YES), the flow proceeds to stop or end the process. If at step S616, it is determined that no positive NIRAF signal exists in nearby frames, it is highly likely that the current frame (or A-scan) is a potential false positive (i.e., not a true fluorescence signal). The order of steps S612 to S616 can be changed, altered or combined; and one or more steps can be selected or skipped. At step S618, the computer 200 marks the location of the current frame as a potential "false positive" case. At step S620, similar to step S520, the system stores and displays the potential false positive locations, or prompts the user to confirm display of such locations. For example, the system can be configured (programmed) to inform the user (display a message) indicating that one or more locations with potential "false positive" information exists within the processed data. Then the user can toggle the switch 350 to observe and confirm manually the status of each false positive location.

Continuing to refer to FIG. 6, at step S608, the distance between lumen edge and catheter sheath (imaging probe) should be a small distance, like around 10 μm. This distance generally depends on the OCT resolution, beam spot diameter, light source power, etc., so the distance between lumen edge and catheter may be manually configured by the user, or may be pre-stored in the system. At step S612, the threshold arc angle can be a predetermined arc of about 5 degrees, 10 degrees, 20 degrees, etc., or it can different for each type of lumen being imaged. The purpose of defining a threshold arc angle for the tomographic view is to avoid any small signal spikes due to catheter attachment to the lumen or any other extraneous cause of artifacts. At step S614, the lumen diameter size can be larger than a minimum threshold diameter, e.g., in some instances a minimum lumen diameter of 2 mm can be expected; or, it can be changed by a user according to the lumen being examined or the size/type of catheter being used. If a reference OCT frame is decided, the minimum threshold diameter can be determined based on the lumen diameter in the reference frame. For example, 80% of the reference frame lumen diameter can be used as the minimum threshold diameter. At step S616, the number and/or distance of "nearby frames" can be predetermined by the system, or can be set by a user. For example, a number of frames within about 1 mm distance for a selected or target frame can be set by the user.

To determine locations of true auto-fluorescence and/or potential blind spots in high-risk coronary artery plaques, the present disclosure proposes to confirm the sources of near-infrared auto-fluorescence (NIRAF) by a histopathological correlative analysis. This analysis is based on prior research which has shown a positive correlation between morphological features associated with high-risk plaques and regions of high NIRAF acquired via catheter-based multimodality OCT-NIRAF imaging. Subsequent ex vivo research suggested that NIRAF is a marker of intraplaque hemorrhage (IPH), which is one of the indicators of high-risk plaques. This study aims to clarify sources of high NIRAF and/or blind spots thereof using histological sections. Serially sectioned, formalin-fixed, paraffin-embedded histological slides from human cadaver coronary arteries were stained with glycophorin A (IPH marker) and Sudan Black (ceroid marker), and compared with confocal NIRAF images acquired with excitation light of 635 nm and fluorescence emission of 655 to 755 nm from adjacent unstained slides. Each of the images was split into 8 45-degree sectors, centered at the lumen's centroid. Each sector was analyzed visually for NIRAF or staining positivity, which is defined as more than 10% of the intima in the sector contained NIRAF, glycophorin A, or Sudan Black staining.

Figure 7:
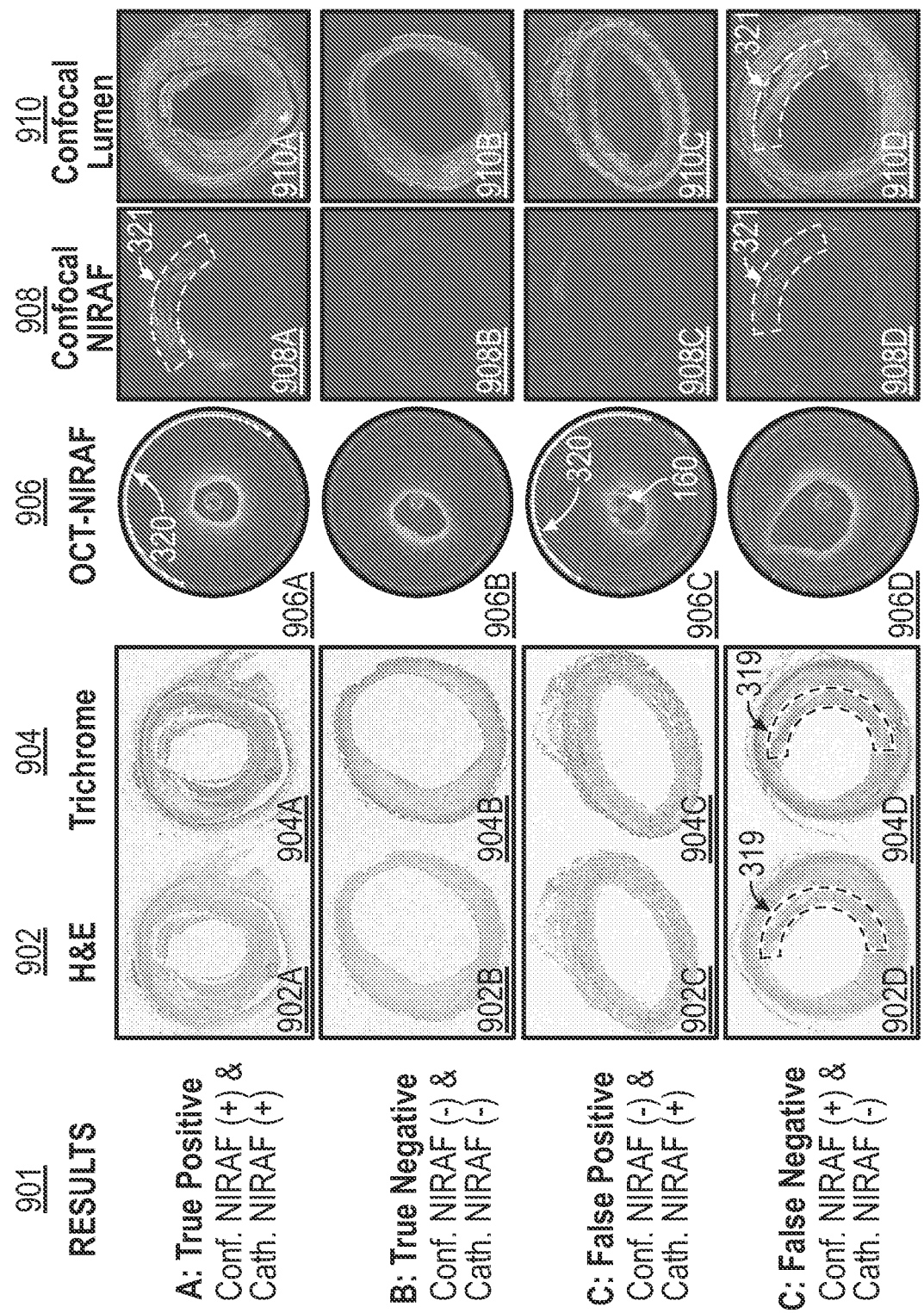
FIG. 7 shows a comparison between histologic (H&E, Masson's trichrome) images, OCT-NIRAF images, and confocal NIRAF images to identify potential false positive, false negative, and/or blind spot locations of fluorescence.

FIG. 7 illustrates exemplary results of an exemplary histopathological correlative case study performed by the inventor of the present application according to the principles disclosed herein. These results show instances where true fluorescence is detected, and instances where detection of potential false positive, false negative and/or blind spot sources of fluorescence occurs. In this study, a plurality of multimodality catheter-based images 906 of a lumen sample are compared to corresponding hematoxylin and eosin (H&E) images 902, Masson's trichrome images 904, Confocal NIRAF images 908, and Confocal Lumen images 910. Results 901 are tabulated in the left most column of FIG. 7 in rows A through D. H&E images 902 include a first image 902A, second image 902B, third image 902C, and fourth image 902D. Trichrome images 904 include a first image 904A, second image 904B, third image 904C, and fourth image 904D. OCT-NIRAF images (catheter images) 906 include a first image 906A, second image 906B, third image 906C, and fourth image 906D. Confocal NIRAF images 908 include a first image 908A, second image 908B, third image 908C, and fourth image 908D. Confocal lumen images 910 include a first image 910A, second image 910B, third image 910C, and fourth image 910D.

Both H&E images 902 and Masson's trichrome images 904 are histology images that reveal lesions classified into ruptured plaque, fibroatheroma, fibrocalcific plaque, pathological intimal thickening, fibrous plaque, and intimal hyperplasia. Confocal NIRAF images 908 and confocal lumen images 910 are images acquired by confocal fluorescence microscope from sections of the lumen nearby the H&E and Trichrome sections (e.g., within a few microns) to evaluate micro-localization of NIRAF in the coronary artery wall of the lumen sample. Two pairs of excitation and emission wavelengths were used to acquire confocal NIRAF and confocal lumen images: excitation at 405 nm and emission at 425-475 nm was used to evaluate whole tissue shape and orientation (confocal lumen images 910); and excitation at 635 nm and emission at 655-755 nm was used to identify the microscopic NIRAF distribution near the lumen edge (confocal NIRAF images 908).

Figure 8A:
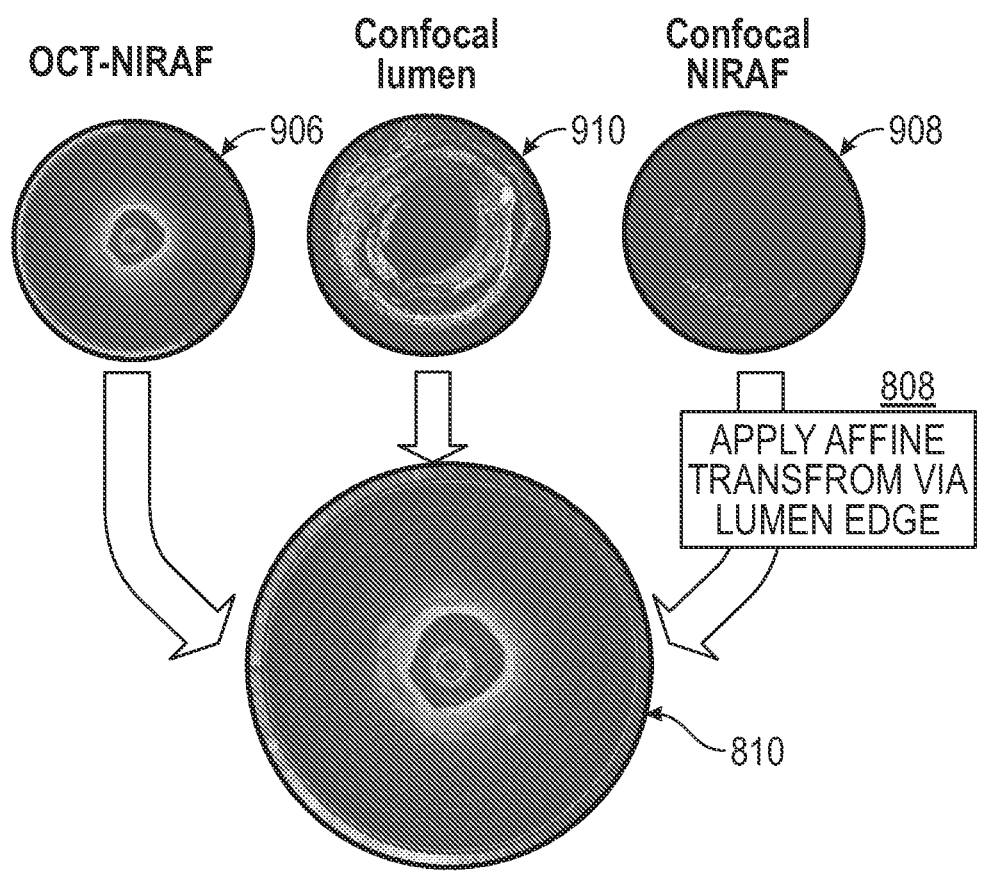
FIG. 8A shows an algorithm for registering OCT-NIRAF images with confocal NIRAF images.

To determine localization of fluorescence in confocal NIRAF and catheter-based NIRAF, registration between confocal NIRAF images 908-910 and OCT-NIRAF images 906 was performed. Registration has two steps: (1) matching between confocal NIRAF and OCT-NIRAF images, and (2) transforming confocal NIRAF to align with OCT-NIRAF images. FIG. 8A shows an exemplary process for registering an OCT-NIRAF image 906 with a confocal lumen image 910, and a confocal NIRAF image 908. For matching (step 1), H&E and Masson's trichrome images (histology images) were used to identify characteristic features of the lumen. First, histology images that contain fibrocalcific plaque and/or side branches were selected, and their corresponding OCT-NIRAF images were found based on those morphological features. Other morphological features may include plaque type characteristics such as one or more of lumen rupture; fibroatheroma, fibrocalclfic plaque, Pathological intimal thickening, Fibrous plaque, and Intimal hyperplasia. For the rest of the histology images (images without identifiable morphological features, e.g., fibrocalcific plaques and/or side branches), the corresponding OCT-NIRAF images were found based on matched pairs based on lumen diameter and pullback information, such as speed and direction of scanning. After matching, for transforming (Step 2), confocal NIRAF images were transformed to align with OCT-NIRAF images via matching lumen edges.

In FIG. 8A, the confocal NIRAF image 908 is transformed by an Affine transform 808 to align with OCT-NIRAF images via matching lumen edges. Since confocal lumen and confocal NIRAF images were acquired from approximately the same sections of the lumen, as described above, the lumen edge detected in confocal lumen images were used as the lumen edge from confocal NIRAF images. In this process, first, lumen edges were identified in both confocal images and OCT-NIRAF images, and the feature points on lumen edge based on plaque types and/or side branches were identified from both images. Then, the Affine transform 808 was applied on the confocal NIRAF image 908 to align the detected lumen edges and the same feature points identified in the OCT-NIRAF images 906 and confocal lumen images 910. The resulting registered image Bio is shown at the bottom FIG. 8A.

Figure 8B:
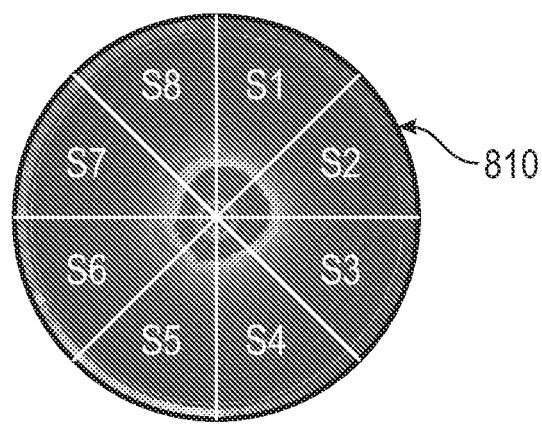
FIG. 8B shows a registered image divided into a plurality of sectors for analyzing characteristic structures and detecting false positive, false negative, and/or blind spot locations of fluorescence data.

To determine fluorescence positivity for confocal NIRAF and catheter-based NIRAF images, the registered confocal NIRAF and OCT-NIRAF images (the registered image 81o) is split into a plurality of sectors of equal dimensions. FIG. 8B shows an example of a registered OCT-NIRAF and confocal NIRAF image 810 divided into a plurality of sectors (S). In this example, the registered image 810 was divided into 8 sectors (S1, S2, S3, S4, S5, S6, S7, and S8) of 45-degrees each, centered at the catheter location in OCT-NIRAF image.

For each 45-degree sector, positivity for confocal NIRAF and catheter-based NIRAF were evaluated as follows. For confocal NIRAF image, after averaging the intensity of a Z-stack of images, the image was binarized with a threshold of top 50% of 8-bit gray-scale level. This binarization threshold was deemed acceptable by a board-certified pathologist by comparing the original image and binarized images. After binarization, for each 45-degree sector, the area of a confocal NIRAF-positive signal was evaluated with increments of 0.1 mm depth from the lumen edge. Each sector was considered as confocal NIRAF-positive when the size of the binarized area was larger than 5% of vessel wall area. The vessel wall area was calculated from an average of the actual lumen diameter within the 45-degree sector and assuming a thickness of intima and media of about 1.0 mm. The catheter-based NIRAF was considered as positive in a 45-degree sector if more than 60% of the A-lines in the 45-degree sector have the calibrated NIRAF intensity higher than the system's limit of detection (LOD). Naturally, the above parameters (e.g., number and size of sector, size of binarized area, thickness of intima and media, etc.) in the confocal NIRAF image, and/or parameters of the catheter-based NIRAF can be modified according to the application and/or user's preference. For example, in some embodiments where the thickness of intima and media of about 0.5 mm, we can consider the 45-degree sector is positive when at least 5% of the 45 deg. arc is above the system limit of detection (LOD). In other words, the threshold for signal positivity can be changed and the data can be adjusted without departing from the general concept of data analysis to determine potential false positive, false negative, and/or blind spot cases.

After evaluating positivity of confocal NIRAF and catheter-based NIRAF for each 45-degree sector, correlation between confocal NIRAF and catheter-based NIRAF was evaluated in terms of sensitivity, specificity, positive predictive value (PPV), and negative predictive value (NPV) using confocal NIRAF as ground truth. Where sensitivity is a ratio of true positive (TP) divided by the sum of true positive plus false negative, i.e., sensitivity=TP/(TP+FN); specificity is a ratio of true negative (TN) divided by the sum of true negative plus false positive, i.e., specificity=TN/(TN+FP); PPV=TP/(TP+FP), and NPV=TN/(TN+FN).

The results of comparison between histology (H&E, Masson's trichrome), OCT-NIRAF, and confocal microscopic images are shown in column 901 of FIG. 7. In row A: Catheter-based NIRAF shown by a marker 320 was observed in the first OCT-NIRAF image 906A in the same area shown by a marker 321 where confocal NIRAF was observed in the first confocal NIRAF image 908A. Namely, NIRAF data in OCT-NIRAF image 906A was confirmed by fibroatheromas observed in the confocal NIRAF image 908A. Therefore, this is a true positive case. In row B: No confocal NIRAF was observed in the second confocal NIRAF image 908B, and thus no catheter-based NIRAF was observed in the second OCT-NIRAF image 906B. Therefore, this is a true negative case. In row C: Although no confocal NIRAF was observed in the third confocal NIRAF image 908C, catheter-based NIRAF showed positivity in the OCT-NI RAF image 906C as indicated by marker 320. This catheter-based NIRAF is believed to have been caused by the fact that the catheter 160 was attached to (touching) the lumen wall. Therefore, this case is marked as a potential false positive case. In row D: no catheter-based NIRAF was observed in the fourth OCT-NIRAF image 906D, but confocal NIRAF was observed in confocal images 908D and 910D as shown by marker 321. Moreover, histological images 902D and 904D also show fibrocalcific plaques, as indicated by a marker 319. Therefore, this case is determined to be a potential false negative case.

More specifically, in FIG. 7, the left-most column shows detection results 901 from automated data analysis performed by, for example, computer 200. In row A, the result of image analysis shows the detection of fluorescence is "True Positive". Specifically, row A represents a case where analysis of the OCT data in the OCT-NIRAF image (Cath. NIRAF) has determined existence of true NIRAF data, by comparing the OCT-NIRAF data with the corresponding confocal microscopy image (confocal NIRAF). As explained above, histological images can be used to confirm morphological characteristic features detected by OCT data (or suspected base on OCT data). Row B represents a case where analysis of OCT data in the OCT-NIRAF images does not detect existence of NIRAF data; this is confirmed by analysis of the histologic and confocal images as no NIRAF is observed in the corresponding confocal NIRAF image. Row C shows a case where analysis of OCT data in the OCT-NIRAF image appears to show existence of NIRAF data. However, NIRAF is not clearly observed in the corresponding confocal NIRAF image. Moreover, histological images (H&E and Trichrome) do not show morphological characteristics indicative of plaque or similar structures. Therefore, this result is most likely due to the fact that the catheter 160 is in substantial contact with lumen surface (e.g., the distal tip of the catheter is touching the sample surface). Therefore, the OCT-NIRAF image 906C will need to be confirmed by the user. Therefore, the system can mark the image frame as potential false positive, and later present this information to the user for confirmation. In row D, on the other hand, although NIRAF is observed in the confocal NIRAF image 908D and in the confocal lumen image 910D, analysis of the OCT data in the OCT-NIRAF image 906D does not show any NIRAF signal. In row D, even the histological H&E and Trichrome images appear to show the lumen has a reduced diameter due to calcification of the vessel wall. Nevertheless, the OCT-NIRAF data does not show fluorescence data. A reason for the lack of fluorescence detection in OCT-NIRAF image 906D can be that the areas of the vessel with calcified plaque have attenuated or prevented the fluorescence signal from traveling from the vessel to the catheter. Therefore, row D may represent a case of a potential blind spot or false negative where the MMOCT catheter cannot detect fluorescence signal because of a biological, pathological, and/or technical reason. In this case too, the OCT-NIRAF image 906D will need to be confirmed by the user. However, to alleviate the user's decision making processes, the system automatically registers and/or displays the location(s) of these potential false positive, false negative, and/or blind spot cases.

By referring to FIG. 7, accuracy of catheter-based NIRAF detection can be more precisely established by applying one or more of the image processing algorithms described in the present disclosure with respect to FIG. 4, FIG. 5, FIG. 6, and FIG. 8A-8B. Catheter-based NIRAF is present when a certain amount of confocal NIRAF is observed in the area relatively close to the lumen edge. However, it is difficult to confirm whether catheter-based NIRAF does exist by simply observing the OCT-NIRAF image or by automatically classifying each OCT-NIRAF image according to morphological characteristics (from histology images). Therefore, it is advantageous to configure the multimodality imaging system with a graphical user interface to allow the user to manually confirm the actual status of potential false positive, false negative, and/or blind spot locations in a given image.
<Simplified Display of Potential False Positive, False Negative and/or Blind Spot Locations>

FIG. 9A through FIG. 9F illustrate exemplary embodiments of how to display potential false positive, false negative, and/or blind spot locations in multimodality OCT-fluorescence images. According to FIG. 9A, FIG. 9B, FIG. 9C, FIG. 9D, FIG. 9E, and FIG. 9F, identification of potential false positive, false negative, and/or bind spot locations of fluorescence data can be displayed in in one or more of a tomographic view and a longitudinal view of the multimodality image. As described above, a tomographic view can provide the rotational or circumferential location indicative of where the fluorescence signal is positive, or indicative of where potential false positive, false negative, and/or blind spot locations are present. False positive, false negative, and/or blind spot locations can be displayed in a variety of ways. For example, when a potential false positive location exists within a tomographic view, a color coded or specific patterned line indicator can be displayed above or near the detected or suspected NIRAF location. When the system is programmed to identify a specific parameter or parameters, such as biological, pathological, or technical reason(s), for a potential blind spot, false negative, or false positive result, the location of such result can be displayed according the specific cause, reason, or parameter. For example, each type of location (false positive, false negative, or blind spot) can be displayed using different color lines, different patterns, different values of grayscale levels to represent each type of case, etc. Similarly, each reason (e.g., biological, pathological, or technical reason) for designating a location as false positive, false negative, or blind spot can be shown using a specific color or grayscale value or pattern.

Figure 9A:
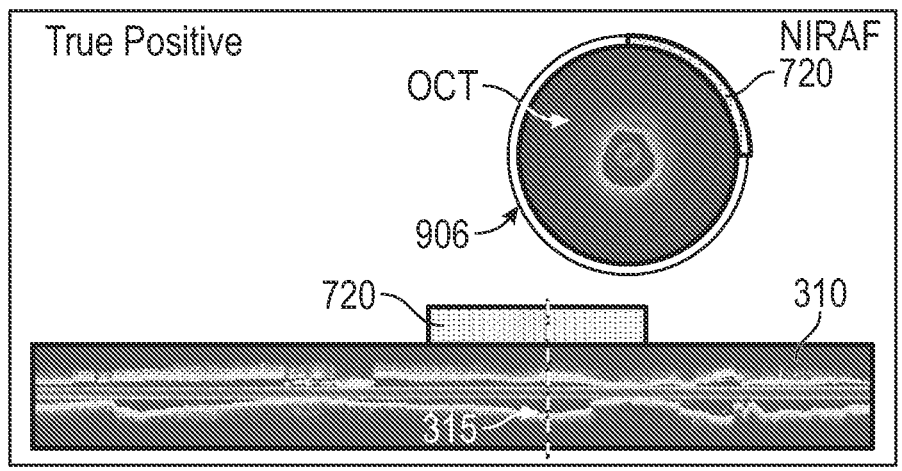
FIG. 9A though
Figure 9B:
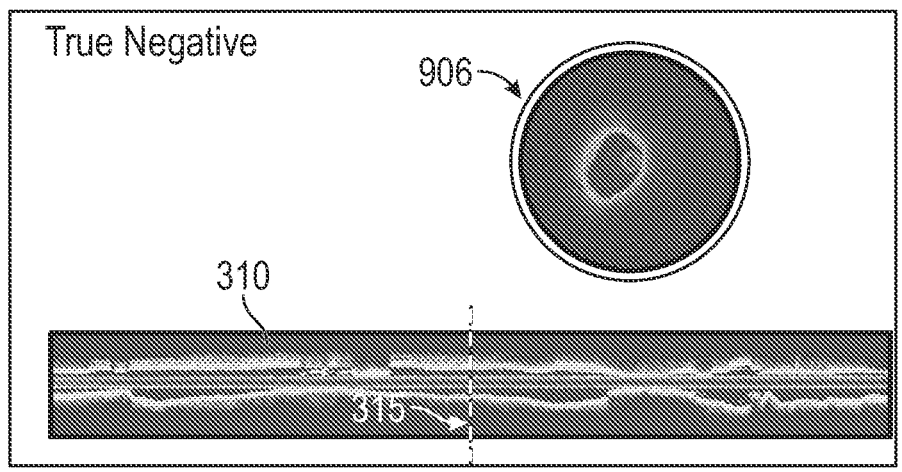
FIG. 9F illustrates exemplary embodiments of a graphical user interface (GUI) configured to display potential false positive, false negative, and/or blind spot locations in multimodality OCT-fluorescence images acquired by the catheter-based imaging system 100.

FIG. 9A illustrates a first case (CASE 1) where the system is able to positively confirm detection of a fluorescence signal and display the result thereof in the tomographic view and/or the longitudinal view of a multimodality image. FIG. 9B illustrates a second case (CASE 2) where the system is able to positively confirm lack of presence (i.e., absence) of a fluorescence signal and display the result thereof in the tomographic view and/or the longitudinal view of the multimodality image. Methods or processes for confirming the positive detection (or lack of detection) of a fluorescence signal are known, for example, as described in the above-referenced publication US 2014/01276107. As described in this publication, the presence or absence of a fluorescence signal can be based on signal intensity levels corresponding to types of tissue, concentration of certain substances within tissues, levels or stages of malignancies before the onset of cancer, etc. In the present disclosure, the MMOCT system is configured to determine positivity of fluorescence (or lack thereof) according to the processes described above in reference to FIG. 7 and FIG. 8A-8B. In addition, the system is configured to inform the user of the location of the fluorescence signal with respect to the OCT data in the multimodality image of a lumen sample. To minimize user confusion, the system displays a simplified version of the multimodality mage (e.g., an image of reduced size) along with a representation (a marker) indicative of the location of fluorescence data.

In FIG. 9A, the system displays the multimodality image 906 as a tomographic view where the OCT data 310 is partially surrounded by a marker 720 (first marker) around the edge of the tomographic view. The marker 720 informs the user that a positive fluorescence signal has been detected in a region between 12 and 3 o'clock on the wall of the lumen sample. The marker 720 is also shown in the longitudinal view overlaid (superposed) or side-by-side with the longitudinal view of the OCT data 310. In the longitudinal view, the line indicator 315 is indicative of the location along the length of the lumen from which the tomographic view is taken. The tomographic view and the longitudinal view of the OCT data are displayed with the first marker 720 using the same color or same shading or same pattern for both views.

In FIG. 9B, the system displays the tomographic view of the OCT data without any type of marker in relation to fluorescence data. That is, in the second case, when the system confirms that no fluorescence signal exists at the location of line indicator 315, both the longitudinal view and the tomographic view are displayed without the marker 720 because this case shows a true negative result (i.e., a case where the multimodality image 906 does not contain any fluorescence signal).

Figure 9C:
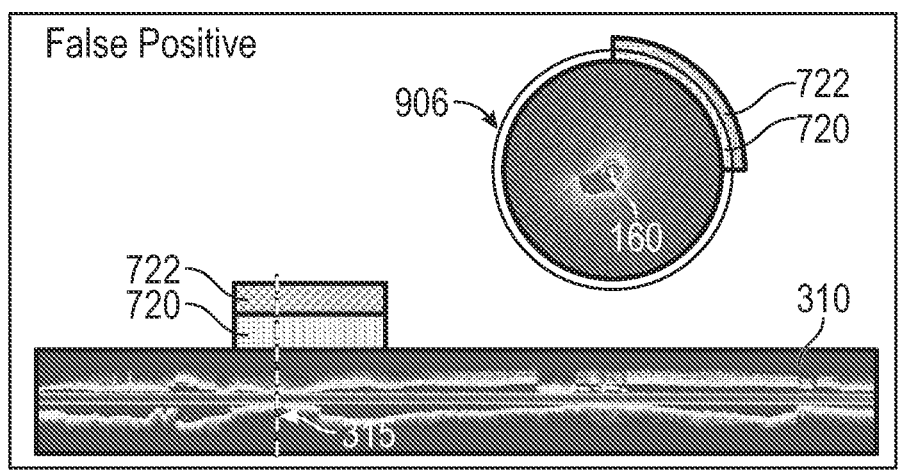

FIG. 9C illustrates a third case (CASE 3) where the system has determined that multimodality image includes a fluorescence signal, but the fluorescence signal might be a potential false positive result. In this case, the system determines that the fluorescence signal is most likely a "false positive" result based the analysis of the OCT data. For example, the longitudinal view of the OCT data 310, at the position of line indicator 315, shows no structural features that would generate a fluorescence signal. Nevertheless, a positive fluorescence signal is detected. A reason for the presence of fluorescence can be that a distance of the catheter 160 to the lumen edge is at or below a predetermined distance. This potential false positive case is similar to the case of image 906D shown in FIG. 7 and discussed above. In this case, the marker 720 is displayed to show the existence of fluorescence. In addition, to inform the user that the fluorescence signal is a potential false positive, the system displays an additional marker (a second marker) 722. The second marker 722 is added with a distinct color or shading or pattern not similar to the first marker 720. To be distinct and unique, the second marker 722 in at least one of the tomographic and longitudinal views can be configured to intermittently blink or to intermittently increase and decrease in size or to change colors to call the user's attention.

Figure 9D:
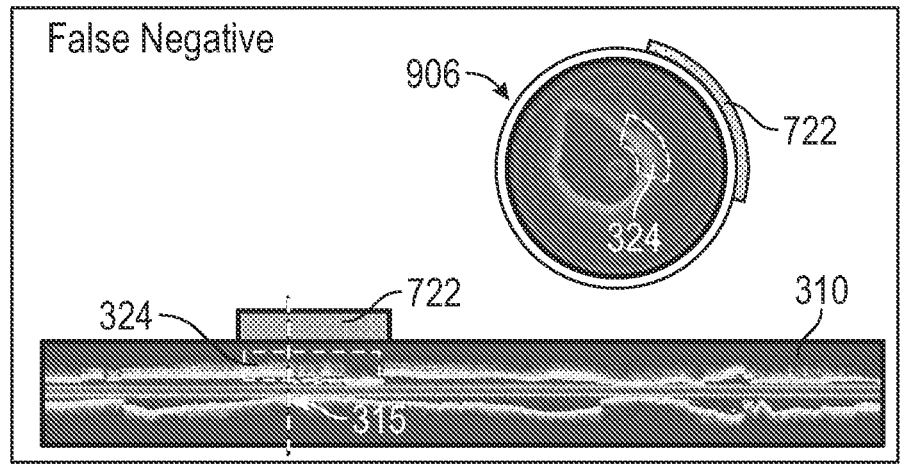

FIG. 9D shows a fourth case (CASE 4) where the multimodality image 906 shows a tomographic view of the OCT data without any fluorescence signal. However, the system analysis of the OCT data 310 reveals characteristic structural features that can be a source of fluorescence. These characteristic structural features, shown by an indicator 324, can include intimal thickening, abnormal adventitia, or damaged periadventitial tissue. Therefore, in this case, the system displays the second marker 722 on both the tomographic view and the longitudinal view of the OCT data. In this case, the second marker 722 is indicative of a potential false negative result (i.e., a fluorescence signal is not shown, but the data analysis of the OCT image reveals existence of a source of fluorescence). In case 4, the system displays the second marker 722 with a specific and distinct color or pattern specific to a "false negative" result. This will prompt the user to analyze and confirm if the location shown by line indicator 315 includes fluorescence or not. The color or pattern or line used to display the second maker corresponding to a false negative value is preferably displayed with color or pattern or grayscale value different from the first marker 720.

Figure 9E:
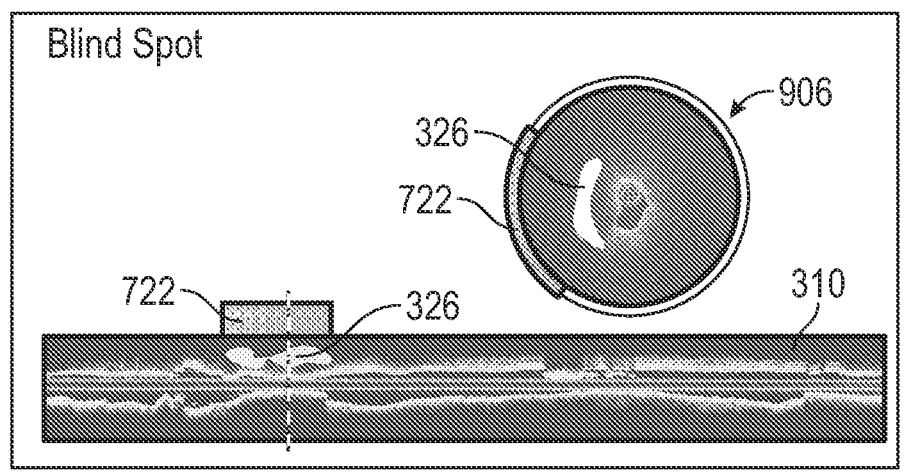

FIG. 9E shows a further case (CASE 5) where the multimodality image 906 shows a tomographic view of OCT data without a fluorescence signal. However, the system analysis of the OCT data reveals that characteristic features of the lumen sample include one or more artifact 326 that could be a potential source of fluorescence. In this case, the artifact 326 can include, for example, built-up plaque, such as atherosclerotic plaque or atheroma, fibrous plaque, fibrocalcific plaque, or a necrotic core of the lumen sample. CASE 5 is similar to CASE 4 in that a region of the lumen sample shows a potential source of fluorescence, but no fluorescence signal is detected. In CASE 5, however, the region with artifact 326 could include calcified plaque or other unknown component. Therefore, the system marks the region with artifact 326 with a specific color or pattern distinct from the first marker 720 or second marker 722. In addition, the system displays the multimodality image with the second marker 722 as an arc surrounding the edge of the tomographic view in correspondence with the circumferential location of artifact 326. The system also displays, in the longitudinal view, the second marker 722 overlaid on (or side-by-side of) the OCT data 310 in correspondence with the location of line indicator 315. In CASE 5, if a fluorescence signal is not detected by the system, but an artifact 326 is observed in the OCT image, the system classifies the artifact 326 as a potential blind spot case (e.g., a case where a fluorescence source may exist, but fluorescence excitation light does not reach the plaque region or the fluorescence signal does not reach the catheter). Therefore, system displays the second marker 722 and the artifact 326, in the tomographic view and along the length of the longitudinal view to show correspondence between a potential fluorescence signal and the OCT data. In this case too, the second marker 722 can be displayed with particular distinction to prompt the user to confirm if the artifact 326 is a false positive or false negative or blind spot (undefined) location.

Figure 9F:
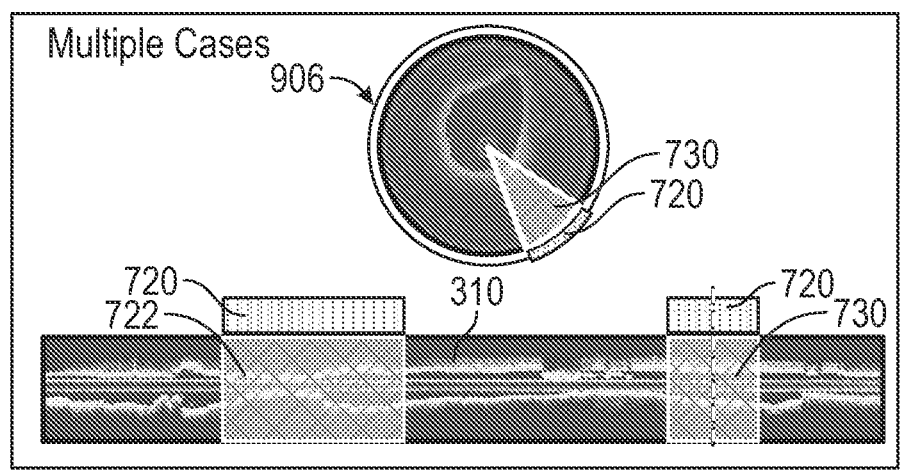

FIG. 9F shows an example where the system is configured to display multiple cases of potential false positive, false negative, and/or blind spot locations. In FIG. 9F, the firs marker 720 is indicative of the detection of a fluorescence signal, and the second marker 722 is indicative that the fluorescence signal can be a potential false positive as shown in FIG. 9C. However, when the user moves the line indicator horizontally along the length of the longitudinal view to the position shown in FIG. 9F, the tomographic view changes to show a different cross-section of the lumen sample. Therefore, in FIG. 9F, the system displays the second marker 722 overlaid over the OCT image data 310, and adds a third marker 730 to show a new location of fluorescence data shown in by first marker 720A or a new potential false positive, false negative, and/or blind spot location indicated by the third marker 730. In other words, the differences between FIG. 9C and FIG. 9F is that the second marker 722 overlaid with the OCT image of the lumen sample, and the third marker 730 is added to show the location of an additional false positive, false negative, and/or blind spot location.

FIG. 10A, FIG. 10B, FIG. 10C, and FIG. 10D illustrate various examples of a further embodiment for a graphical user interface to display potential false positive, false negative, and/or blind spot locations of fluorescence in multimodality OCT-fluorescence images. According to this embodiment, the fluorescence image data (NIRAF profile view) can be displayed as a simplified binary display or histogram. The general definition of a histogram is a graphical representation of data. Here, the term "histogram" is used to refer to the pictorial manifestation of the fluorescence intensity data. A traditional histogram can tell the frequency of each intensity value from 0 to 255 in the gray-scale equivalent of a picture. The histogram plots each of the intensity values versus the number of pixels that has that value; therefore, a histogram can provide the distribution of various intensity values in a simplified picture. In the present case, to simplify the display of presence or absence or fluorescence data (NIRAF data), a basic binary display (e.g., two color, two gray scale values, or two patterns) can be used. In addition, to display to display potential false positive, potential false negative, and/or blind spot case, together with presence/absence of fluorescence data a few more colors, grayscale values, or patterns is sufficient.

A binary histogram can be displayed along the longitudinal direction in vessel length view (longitudinal view) by discarding angular information of the tomographic view and simplifying the display of fluorescence intensity to high (H) and low (L) values. To that end, each multimodality image can be defined by a small number of values corresponding to signal intensity. For example, NIRAF intensity can be defined around a median value ranging between high and low threshold values (e.g., plus and minus 25% of the median value). In one embodiment, the histogram can have low and high values to indicate the presence (value 1) or absence (value 0) of fluorescence along the length of the lumen. In other embodiments, the histogram can have more than two values, such that each value can represent the intensity level at each location along the length of the lumen.

For facilitating user's quick assessment of a signal, the fluorescence signal (each high or low value of the histogram) can be color coded or shaded to show correspondence with the various possibilities of presence of fluorescence or lack thereof. Here too, the analysis of the image data can be done for each acquired OCT-NIRAF image, on a frame by frame basis, or for each A-line, or for every 10 (or other predetermined number) of A-lines, or in tomographic view by dividing the image into a predetermined number of sectors. In addition, to improve the accuracy of analysis, cross-frame analysis (comparing nearby frames, e.g., 10 frames prior and after a target frame) can be performed.

Figure 10A:
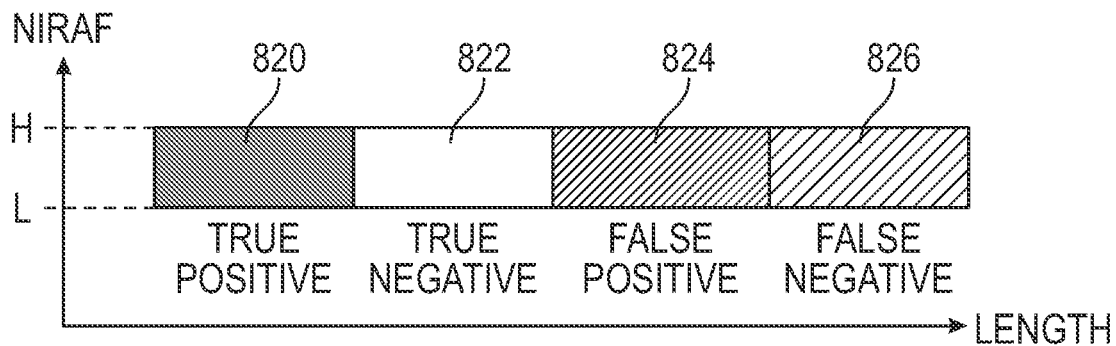
FIG. 10A, FIG. 10B, FIG. 10C, and FIG. 10D illustrate various examples of a further embodiment for a graphical user interface configured to display potential false positive, false negative, and/or blind spot locations of fluorescence in multimodality OCT-fluorescence images.
Figure 10B:
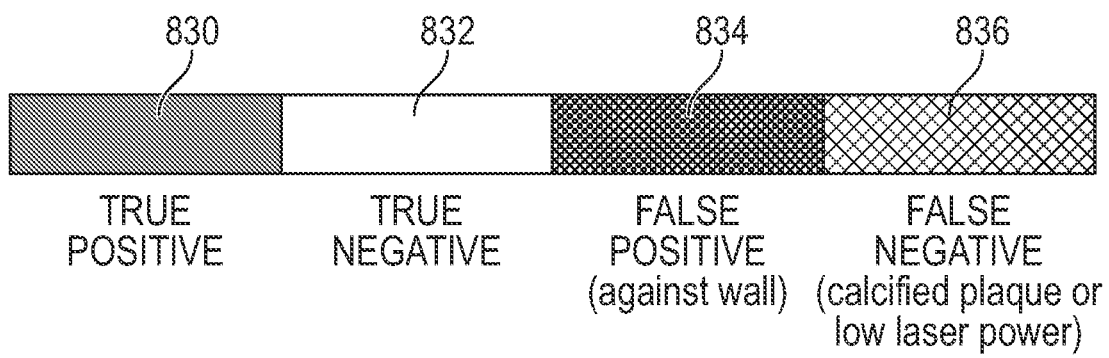

FIG. 10A and FIG. 10B illustrate examples of how the third panel 321-3 of display 320 can be configured to display the fluorescence signal in binary form instead of (on in addition to) the carpet view shown in FIG. 3. Like the concept of OCT lumen profile (or lumenogram), the fluorescence signal can be displayed as NIRAF profile (or Nirafogram) to provide a simplified view of the fluorescence signal in the longitudinal view for easier user evaluation. In the longitudinal view, the carpet view is replaced by a histogram which discards the angular information to show only the presence of NIRAF in terms of the length of pullback. Then, possible actions taken by the user, based on this simplified NIRAF profile view, are (i) go to each slice with NIRAF to look closer at the OCT to see what might have happened at that location, and (ii) decide on where to perform a procedure (e.g., place the stent) by intentionally avoiding (or targeting) the sample regions with confirmed NIRAF signal.

Possible algorithms for displaying NIRAF include. For Display of NIRAF Intensity: (a) Display the sum of the NIRAF intensity present in a slice. (b) Display the peak NIRAF intensity present in a slice. (c) Use (a) or (b), but display intensity in increments (e.g., high, medium, low) that are defined by thresholds (e.g., low=2.5V, high=5V, and medium=average between high and low). For Display of NIRAF Presence (Binary NIRAF): (d) If NIRAF is present anywhere in a slice, and is greater than a threshold (e.g. 5V), then display YES NIRAF for that slice. (e) If the sum of NIRAF intensity present in a slice is greater than a threshold (e.g. 5V), then display YES NIRAF for that slice. (f) Use (c) or (d), but display NO NIRAF or BLIND SPOT if lower than threshold.

Advantages and benefits of using binary or histogram display include, but is not limited to, saving real estate in the display screen (NIRAF Carpet View takes up a lot of vertical space on the screen, but histogram or binary view can use minimum space). For example, carpet View takes $2\pi r$ in height to provide angular information, while longitudinal view with binary values can be reduce the high to even a single line (few pixels wide) with different color, shade, or pattern to merely show presence or absence of NIRAF. With smaller NIRAF display in longitudinal Vessel View, there is more space for other views, and less confusion for the user. This is particularly advantageous when using several types of images and/or characteristic features (as shown in FIG. 7) to determine whether the fluorescent signal is false positive, false negative, and/or undefined (blind spot). In other embodiments, binary or histogram display also uses less Colors—NIRAF Profile View could be displayed in one color to only indicate presence of NIRAF, saving other colors to illustrate other features and/or minimizing confusion for the user. Furthermore, by showing NIRAF with minimum screen real estate and one or few colors, the system can be configured to display additional application (e.g., spectroscopic OCT) in future updates. More notably, the simplicity of this modified display embodiment requires less time for interpretation by the user.

In FIG. 10A, the patterns can be used to identify and confirm the specific locations of where a true positive signal 820, a true negative signal 822, a false positive signal 824, and a false negative (or blind spot) signal 826 was detected along the length of the pullback. FIG. 10 displays the presence of signals 820-826 along the length of the vessel, regardless of the reason for such classification. Here, it should be noted that not all cases need to be displayed at the same time. In some embodiments, the GUI can be controlled to selectively display only the existence of one or more of the true positive signal 820, true negative signal 822, false positive signal 824, and false negative (or blind spot) signal 826; this can be displayed with or without an estimated location along the length of the vessel. If the location of a given signal along the length of the vessel is not shown in the display, the location can be made available (shown) to the user only when the user selects (clicks) the type of information desired to confirm. For example, after looking at histogram of FIG. 10A, the user can select "False Positive". Then, upon such selection, the system displays the lengthwise locations showing where the potential False Positive signal was detected along the length of the vessel view. These patterns can be used to identify where the true positive, true negative, false positive, false negative (or blind spot) signals are.

On the other hand, in other embodiments as shown in FIG. 10B, the GUI can be controlled to display the existence of one or more of a false positive, false negative, and/or blind spot location along with an specific reason for marking each location as such. FIG. 10B illustrates a display showing a positive signal 830 (confirmed fluorescence signal), a negative signal 832 (confirmed non-existence of fluorescence signal), a false positive signal 834 (potential "false positive" case), a false negative signal 836 (potential "false negative" case). These signals (in particular the false positive and false negative cases) can be stored in memory and/or displayed on the display along with a reason for marking the location as such. In FIG. 1B, certain specific colors or patterns can be used to identify where is true positive, true negative, false positive, false negative (or blind spot) case. For example, when the overall OCT-NIRAF image shows positive fluorescence, but the OCT data analysis reveals existence of "calcified plaque" or "low laser power", the false negative signal 836 can be displayed with a particular pattern consistent a reason for such determination. In this case, each of the positive signal 830, negative signal 832, false positive signal 834, and false negative signal 836 can be assigned a specific color or pattern so that the user can easily identify the existence of false positive, false negative, and/or blind spot locations. The type of pattern or color can be selectable by the user or can be pre-assigned depending on, for example, the reason (biological, pathological, or technical) for designating a given location as either false positive, false negative, or blind spot (undefined). FIG. 10B is an example that can be used when the specific reason for false positive or false negative are known.

Figure 10C:
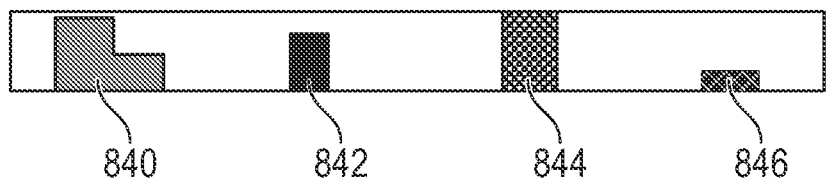

FIG. 10C shows an example of a display screen configured to display a multi-level histogram to inform a user of the presence of a fluorescence signal (positive NIRAF) and a potential false positive case. In FIG. 10C, presence of fluorescence signal is shown as a first positive signal 830, a second positive signal 832, and a third positive signal 836, each with different intensity represented by the size of the marker. In addition, FIG. 10C shows a false positive signal 844. The horizontal direction shows the location along the length of the lumen (vessel view), and the vertical direction shows the intensity level.

Figure 10D:
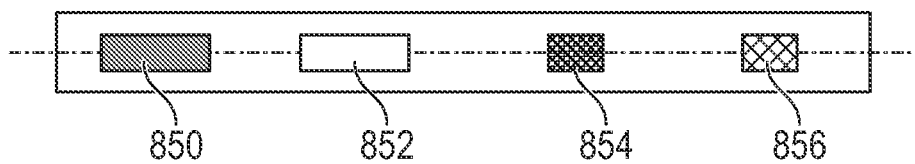

FIG. 10D shows an example of a graphical user interface configured to display a binary histogram with values centered on the display panel. In this example, the GUI can be configured to display a fluorescence signal 850 (positive NIRAF), a true negative signal 852 (lack of NIRAF), a potential false positive signal 854, and a false negative signal 856. As noted with respect to other embodiments, not all signals need to be displayed simultaneously in the display panel. However, it would be advantageous to display each type of signal with a specific color or pattern to make easier and more efficient the interaction of the user with the GUI.

Figure 11:
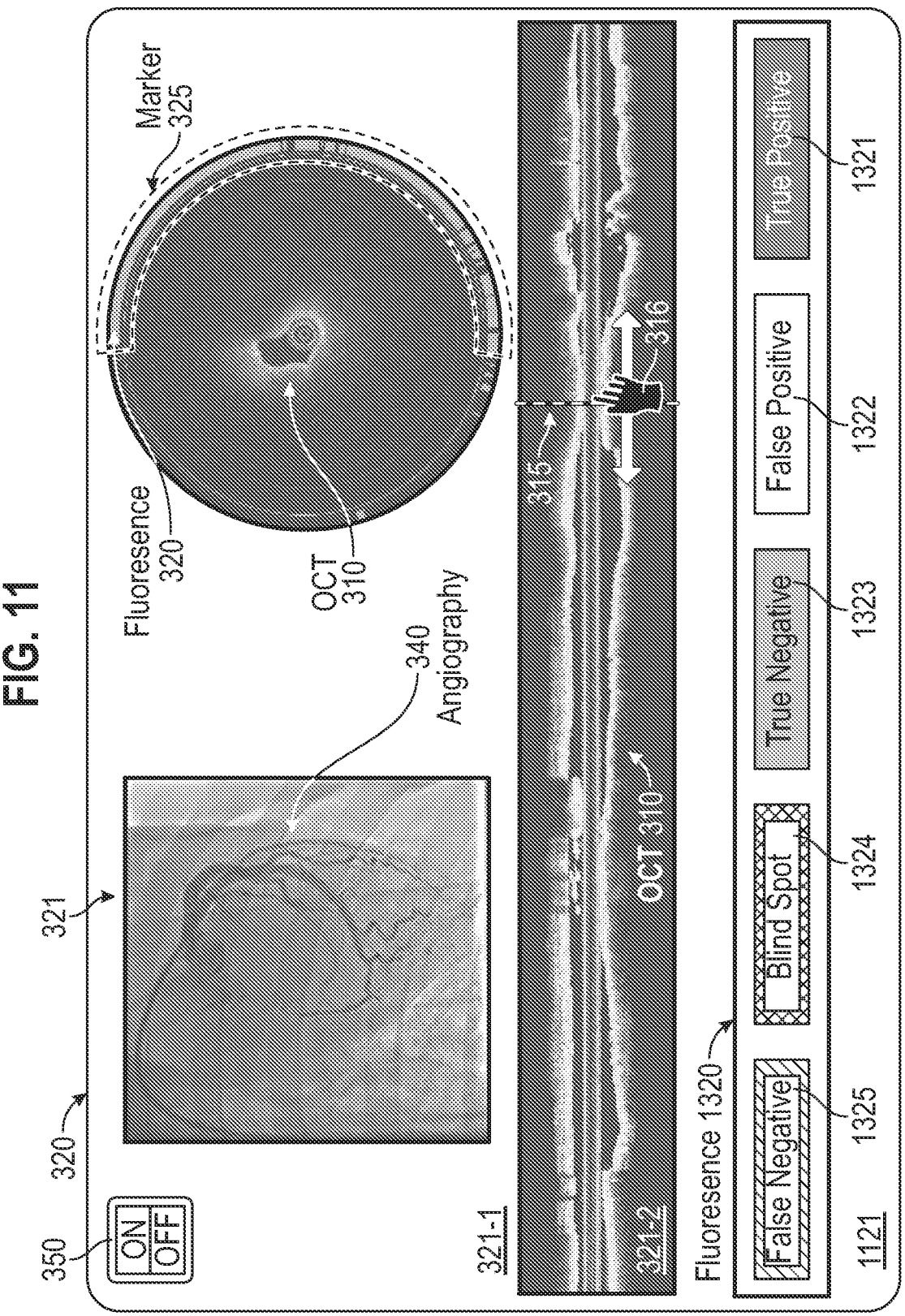
FIG. 11 illustrates a display device 300 with a graphical user interface (GUI) 321 configured for displaying potential false positive, false negative, and/or blind spot locations using a simplified binary panel.

FIG. 11 illustrates a display device 300 with a modified graphical user interface (GUI) 321 for displaying potential false positive, false negative, and/or blind spot locations in a simplified binary manner. In FIG. 11, the GUI 321 shown in display device 300 is controlled by CPU 291 of computer 200 according to the previously described algorithms to display multimodality image information. In this embodiment, the display screen 320 is dived into a plurality of separate display panels including a first panel 321-1, a second panel 321-2, and a third panel 1121. The first panel 321-1 is configured to display an angiography view 340 and a tomographic view of the multimodality image 906 showing the OCT data 310 and fluorescence data 320. The second panel 321-2 is configured to display a longitudinal view of the lumen sample (vessel view) showing only the OCT data 310 for visually assessing structural characteristics of the lumen sample. That is, the first panel 321-1 and second panel 321-2 function similar to the GUI 321 described above in reference to FIG. 3.

The third panel 1121 is configured to display potential false positive, false negative, and/or blind spot locations together with the presence and/or absence of fluorescence data in a simplified manner. In FIG. 11, the second panel 321-2 displays a line indicator 315 to show the lengthwise location of the lumen sample displayed in the tomographic view shown in the first panel 321-1. The line indicator 315 ca be a movable component of GUI 321 that can be interactively controlled by a user to move horizontally with a pointer 316 like a mouse, a joystick, or by touching the screen of display 320. As the user slides the pointer 316 along the longitudinal view of the OCT data, the tomographic view continuously changes to display the OCT data and fluorescence data corresponding to the location of line indicator 315. In this manner, the user can choose the location of the lumen sample to be assessed for structural characteristics along the length of the lumen sample.

To reduce the amount of data that the user has to observer and analyze, the third display panel 1121 is configured to display fluorescence information in a binary manner. Fluorescence information is displayed as one or more of a true positive marker 1321, a false positive marker 1322, a true negative marker 1323, a blind spot marker 1324, and a false negative marker 1325. The true positive marker 1321 is indicative of a true presence of fluorescence signal. The false positive marker 1322 is indicative of the presence of a fluorescence signal which the system has determined to be a potential false positive. The true negative marker 1323 is indicative of a true absence of fluoresce signal. The blind spot marker 1324 is indicative of data which the system is unable to determine its true composition (e.g., data representative of image artifacts). The false negative marker 1325 is indicative of data which can be a source of fluorescence, but the system has not detected a fluorescence signal. Therefore, the false positive marker 1322, the false negative marker 1325, and the blind spot marker 1324 are indicative of potential false positive, false negative, and/or bind spot locations in the multimodality image, which need to be confirmed manually by the user.

The potential false positive, false negative, and/or blind spot information should be able to toggle on/off as a user prefers, so as to not interfere with the user's ability to examine the displayed information. To that end, the GUI 321 may include one or more toggle buttons 350 (or a toggle switch), which the user can operate to execute one or more of the display algorithms described above. In FIG. 11, the toggle buttons 350 can be configured to toggle only the third display panel 1121 to show either the longitudinal view of fluorescence as shown in FIG. 3, or one or more markers in the simplified binary display (shown in FIG. 11). Moreover, in FIG. 11, the system can be configured to toggle each marker 1321 through 1325 as the user slides the line indicator 315 along the longitudinal view of the OCT data 310 using the pointer 316. In this case, toggle buttons 350 can be optionally removed (hidden), and the toggling of one or more of the markers 1321, 1322, 1323, 1324 and 1325 can occur automatically as the user slides the line indicator 315 using the pointer 316.

In one or more embodiments, to improve the system's accuracy, the system can be programmed to learn from mark-ups that a user creates during each procedure. For example, a user could add the location of false positive and/or false negative data after examining the blind spot locations that were not identified by the system. To do so, the GUI 321 in display device 300 should have a button or guidance to prompt the user to optionally annotate or enter specific information, for example, biological and/or technical reasons that often cause blind spot detection. Once a user adds information about false positive and/or false negative cases along with causes therefor, the system can identify patterns of such cases using the OCT data (non-fluorescence data), and can add the identified patterns for future detection. Blind spot (artifact) data that is confirmed by the user as either false positive or false negative can be stored by the system in a data base (table). Then, the system can use such data base to further improve accuracy of detection of potential false positive, false negative and/or blind spots using a trained machine learning network or artificial intelligence (AI) system.

According to the present disclosure, it is advantageous to identify potential false positive false negative, and/or blind spot locations in multimodality images to improve diagnostic results. The above embodiments are described using examples of catheter-based intravascular imaging where the lumen sample can be a blood vessel. Those skilled in the art will appreciate that the principles described herein can be equally applicable to other lumen samples such as respiratory and digestive lumens, which can be imaged by multimodality endoscopes to acquire co-registered multimodality image data comprising blind spot locations. After detection of such locations, the system disclosed herein is configured to display the results in a graphical user interface, and a user is prompted to confirm the results manually. However, a user does not need to rely only on their visual and manual assessment, which can be overwhelmed by an excessive amount of data and may lead to confusion and misinterpretation. Instead, the user may rely on predefined algorithms and an actionable graphical user interface to ask the system to check for potential false positive, false negative, and blind spot locations. Then, the user is prompted by the system to confirm the system's output results. In addition to alleviating a user's decision making process, this technique can be particularly beneficial for a less-experienced user, for example, for training purposes.

The present disclosure has proposed to identify potential false positive, false negative, and/or blind spot cases of fluorescence data in OCT-NIRAF image data by analyzing non-NIRAF information. In one embodiment, for "false positive" detection, the system utilizes lumen detection results and evaluates the distance from the lumen to the catheter sheath or vice versa. In one embodiment, for "blind spot" detection, the system utilizes plaque type characterization, which can be performed by image processing of OCT and/or spectroscopic OCT correlated with histologic information. In one embodiment, for "false negative" detection, the system utilizes correlation of catheter NIRAF data with histologic image data (e.g., H&E and Trichrome).

Based on attenuation coefficient, calcified tissue has most impact on NIRAF detection. Other information can be: lumen diameter, EEL (external elastic lamina), geometric characteristics, flushing efficiency (e.g., is flushing adequate?; is there any residual blood in the OCT frame?). Since it is well known that blood cells emit strong fluorescence, residual blood can be an important indicator of false positive NIRAF detection. The identification can be performed frame by frame. Cross-frame analysis can be added to improve the accuracy. For cross-frame analysis, NIRAF/NIRF information can be utilized to determine relevant parameters, such as how much NIRAF/NIRF exists within a certain distance of a frame in the longitudinal direction.

The system is configured to display a warning indicative of detection of potential false positive, false negative, and/or blind spot cases. The warnings can be toggled ON/OFF based on a user's preference. Marks around the regions of potential false positive, false negative, and/or blind spot cases can be displayed in various configurations. In one configuration, a graphical user interface can utilize a different pattern or different color or different marking to designate each type of image region. In one configuration, the imaging system can be configured to receive input from a user to manually add potential false positive, false negative, and/or blind spot locations to the multimodality image. This configuration is particularly advantageous if a user, bases on his/her experience, finds potential cases that are not identified by the system. In these cases, the user can add potential false positive, false negative, and/or blind spot locations along with a reason for adding such information to the images. According to some embodiments, the system can identify the potential false positive, false negative, and/or blind spot locations based on non-NIRAF information and add labeling patterns to the identified locations for future detection (e.g., for comparing an initial analysis result to a subsequent or later analysis result of the same sample).

In one or more embodiments, to reduce the amount of displayed information, NIRAF information about false positive, false negative, and/or blind spot locations can be presented in binary display form. To this end, NIRAF data can be defined around a median (average) intensity value and within a range of high and low threshold values. This avoids the need of having to display the full range of NIRAF intensity values, such as the "NIRAF carpet view" format which arguably displays more information than clinicians actually need to make a decision. The resultant solution provides a NIRAF Profile View with a simplified display of NIRAF data in vessel view by discarding angular information and simplifying the display of intensity to only location along the vessel length. In a modified embodiment, the same concept of binary display can be applied to NIRF. Assuming NIRF and NIRAF are both displayed on the same system and are distinguishable from one another, the NIRF Profile View could best be implemented by using a different color or different shading or different patterns for the NIRF Profile view than the NIRAF one. Both optional views would be available in the menu of vessel views, and these options can be toggled.

In referring to the description, specific details are set forth in order to provide a thorough understanding of the examples disclosed. In other instances, well-known methods, procedures, components and circuits have not been described in detail as not to unnecessarily lengthen the present disclosure. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. A computer-implemented method of detecting potential blind spots of data in a multimodality image of a lumen sample, the method comprising:
    acquiring a multimodality image of a lumen sample, the multimodality image including first image data co-registered with second image data collected simultaneously by scanning an inner wall of the lumen sample with light of two or more wavelengths transmitted through a multimodality imaging catheter;
    analyzing the first image data to identify a characteristic feature of the lumen sample;
    detecting, based on the characteristic feature of the lumen sample, a potential blind spot location of the second image data in the multimodality image; and
    displaying on a display device the multimodality image with a marker showing the potential blind spot location of the second image data in relation to the first image data in one or more of a plurality of image views,
    wherein the lumen sample includes a blood vessel,
    wherein the first image data includes optical coherence tomography (OCT) image data of the blood vessel, and the second image data includes fluorescence image data of the blood vessel,
    wherein detecting the potential blind spot location includes processing the fluorescence image data based on the characteristic feature of the blood vessel to detect a location of potential false positive and/or a location of potential false negative fluorescence image data in the multimodality image of the blood vessel.

2. The method according to claim 1,
    wherein displaying the multimodality image includes displaying the first image data and the second image data in a first view, and displaying the first image data with the second image data in a second view, and
    wherein the marker showing the potential blind spot location of the second image data is shown in both of the first view and the second view.

3. The method according to claim 1,
    wherein the potential blind spot location includes a location of potential false positive second image data and/or a location of potential false negative second image data.

4. The method according to claim 1,
    wherein analyzing the OCT image data to detect a characteristic feature of the blood vessel includes detecting one or more of a plaque type, an external elastic lamina, a side branch, a minimum diameter, and an amount of residual blood in the blood vessel, and wherein detecting a potential bind spot location of the second data includes analyzing the fluorescence image data to detect the location of potential false positive and/or the location of potential false negative fluorescence data corresponding to the one or more to the plaque type, the external elastic lamina, the side branch, the minimum diameter, and the amount of residual blood in the blood vessel.

5. The method according to claim 1,
wherein displaying the multimodality image with the marker showing the potential blind spot location of the second image data includes displaying the OCT image data and fluorescence image data on the display device with the marker showing the location of potential false positive and/or the location of potential false negative fluorescence data in correspondence with the OCT image data in the first and second views.

6. The method according to claim 5,
wherein displaying the OCT image data on the display device includes displaying the OCT image data in a tomography view and displaying the fluorescence image data includes displaying the location of potential false positive and/or the location of potential false negative fluorescence data as an arc or ring arranged around the edge of the tomography view.

7. The method according to claim 5,
wherein displaying the OCT image data on the display device includes displaying the OCT image data in a longitudinal view and displaying the fluorescence image data includes displaying the location of potential false positive and/or the location of potential false negative fluorescence data in a longitudinal view substantially parallel to or overlapping with the longitudinal view of the OCT data.

8. The method according to claim 5,
wherein displaying the OCT image data on the display device includes displaying the OCT image data in a longitudinal view and displaying the fluorescence image data includes displaying the location of potential false positive and/or the location of potential false negative fluorescence data as binary histogram either superposed on or substantially parallel to the longitudinal view of the OCT data, and
wherein displaying the binary histogram includes displaying a binary marker using a different color or different pattern for each of the location of potential false positive and/or location of false negative fluorescence image data.

9. The method according to claim 1, further comprising:
detecting a lumen edge of the blood vessel from the OCT image data, and
determining whether the catheter is located at or within a minimum distance from the lumen edge.

10. The method according to claim 9,
wherein, upon determining that the catheter is located at or within the minimum distance of the lumen edge, storing and/or displaying the fluorescence image data as indicative of the potential blind spot location.

11. The method according to claim 1, further comprising:
analyzing the fluorescence image data to determine whether the blood vessel includes calcified plaque in at least a certain region thereof,
wherein, upon determining that the at least the certain region of the blood vessel includes calcified plaque, storing and/or displaying the at least the certain region of the blood vessel as the potential blind spot location.

12. A non-transitory computer-readable storage medium storing computer-executable instructions which, when executed by one or more processors, cause the one or more processor to perform the method according to claim 1.

13. A system for detecting blind spots in a multimodality image of a blood vessel, the system comprising:
a memory storing executable instructions, and
a processor configured to execute the executable instructions stored in the memory, wherein the processor is configured to:
acquire a multimodality image of a blood vessel, the multimodality image including first image data co-registered with second image data collected simultaneously by scanning an inner wall of the blood vessel with light of two or more wavelengths transmitted through a multimodality imaging catheter;
analyze the first image data to identify a characteristic feature of the blood vessel;
detect, based on the characteristic feature of the blood vessel, a potential blind spot location of the second image data in the multimodality image; and
display on a display device the multimodality image with a marker showing the potential blind spot location of the second image data in relation to the first image data,
wherein the processor displays the multimodality image by outputting to the display device the first image data surrounded by the second image data in a first view, and outputting the first image data side-by-side with the second image data in a second view,
wherein the potential blind spot location includes a location of potential false positive second image data and/or a location of potential false negative second image data, and
wherein the processor is further configured to:
receive an input request from a user to display the locations of potential false positive and/or potential false negative second image data corresponding to the one or more characteristic features in the displayed image of at least one multiple imaging modality.

14. The system according to claim 13,
wherein the processor displays the marker showing the potential blind spot location in the first view and the second view with a same color or pattern.

15. A system for detecting blind spots in a multimodality image of a blood vessel, the system comprising:
a memory storing executable instructions, and
a processor configured to execute the executable instructions stored in the memory, wherein the processor is configured to:
acquire a multimodality image of a blood vessel, the multimodality image including first image data co-registered with second image data collected simultaneously by scanning an inner wall of the blood vessel with light of two or more wavelengths transmitted through a multimodality imaging catheter;
analyze the first image data to identify a characteristic feature of the blood vessel;
detect, based on the characteristic feature of the blood vessel, a potential blind spot location of the second image data in the multimodality image; and
display on a display device the multimodality image with a marker showing the potential blind spot location of the second image data in relation to the first image data, wherein the processor displays the multimodality image by outputting to the display device the first image data surrounded by the second image data in a first view, and outputting the first image data side-by-side with the second image data in a second view, wherein the processor is further configured to control:

rotation and pullback of an imaging probe which scans of an area of a bodily lumen using at least two different wavelengths irradiated simultaneously on a wall of the bodily lumen to generate optical coherence tomography (OCT) image data and fluorescence image data, and display of the OCT image data and display of the fluorescence image data on the display device, as the image for the each of multiple imaging modalities.

16. The system according to claim 15, wherein the blind spot location includes a location of potential false positive fluorescence image data and/or a location of potential false negative fluorescence image data, and wherein processor is further configured to:

detect the one or more characteristic features of the bodily lumen based on the OCT image data, and detect the location of potential false positive and/or the location of potential false negative fluorescence image data based on the one or more characteristic features of the bodily lumen.

17. The system according to claim 15, wherein the processor is further configured to:

display the OCT image data and fluorescence image data on the display device by displaying the OCT image data as a tomographic view and displaying the fluorescence image data as an arc or ring arranged around the edge of the tomographic view, or display the OCT image data and fluorescence image data on the display device by displaying the OCT image data as a longitudinal view as a function of a pullback distance and a scan angle of the imaging probe, and displaying the fluorescence image data as a binary histogram superposed on or parallel to the longitudinal view of the OCT data.

18. The system according to claim 15, wherein the processor is further configured to:

detect a lumen edge from the OCT image data, and determine whether the lumen edge is located at or within a certain distance from the imaging probe.

19. The system according to claim 18, wherein, if the lumen edge is located at or within the certain distance, the processor updates the displayed image by marking the location of the lumen edge as a location of potential false positive fluorescence data.

20. The system according to claim 16, wherein the processor is further configured to:

analyze the fluorescence image data to determine whether the bodily lumen includes calcified plaque in at least a certain region thereof, and wherein, if the at least the certain region of bodily lumen does include calcified plaque, the processor updates the displayed image by marking the least the certain region of the bodily lumen as a location of potential false negative fluorescence image data.

* * * * *